United States Patent [19]

Castro et al.

[11] 4,383,138

[45] May 10, 1983

[54] METHOD AND APPARATUS FOR PROCESSING CODED INFORMATION RECEIVED THROUGH A TELEPHONE LINE DURING THE INTER-RINGING PERIODS

[76] Inventors: Marcelo Castro; Horacio Castro, both of 5962 El Salvador St., Buenos Aires, Argentina

[21] Appl. No.: 150,178

[22] Filed: May 15, 1980

[30] Foreign Application Priority Data

Mar. 31, 1980 [AR] Argentina .............................. 280506

[51] Int. Cl.³ ........................................... H04M 11/00
[52] U.S. Cl. ................................. 179/84 C; 179/2 A; 179/84 VF
[58] Field of Search ..................... 179/2 A, 5.5, 84 C, 179/89, 18 FH, 18 D, 18 DA, 84 VF

[56] References Cited

U.S. PATENT DOCUMENTS 3,654,396  4/1972  Biezeveld ........................ 179/18 D
3,859,462  1/1975  Saxon ................................ 179/2 A

*Primary Examiner*—Joseph A. Popek
*Attorney, Agent, or Firm*—Fleit, Jacobson & Cohn

[57] ABSTRACT

A method for processing coded information received through a telephone line during the inter-ringing periods. A calling party dials a desired phone number and, once he recognizes the signals indicating that the ringing circuit has been established, he dials a pre-established code during one or more of the inter-ringing periods. Once the code has been received, it is decoded and compared with pre-established codes stored in a memory device. If coincidence is determined, the call is validated via the indicating means. The called party receives an indication that the call is originated by a person who is in possession of the code, and he may elect to answer or not answer the call. If the called party answers the call, the loop is closed and a conversation may take place. Further features include provision for a second code to be sent by the calling party once the loop has been closed, and means for liberating the line, after a certain ringing time has elapsed, when the called party does not answer.

45 Claims, 22 Drawing Figures

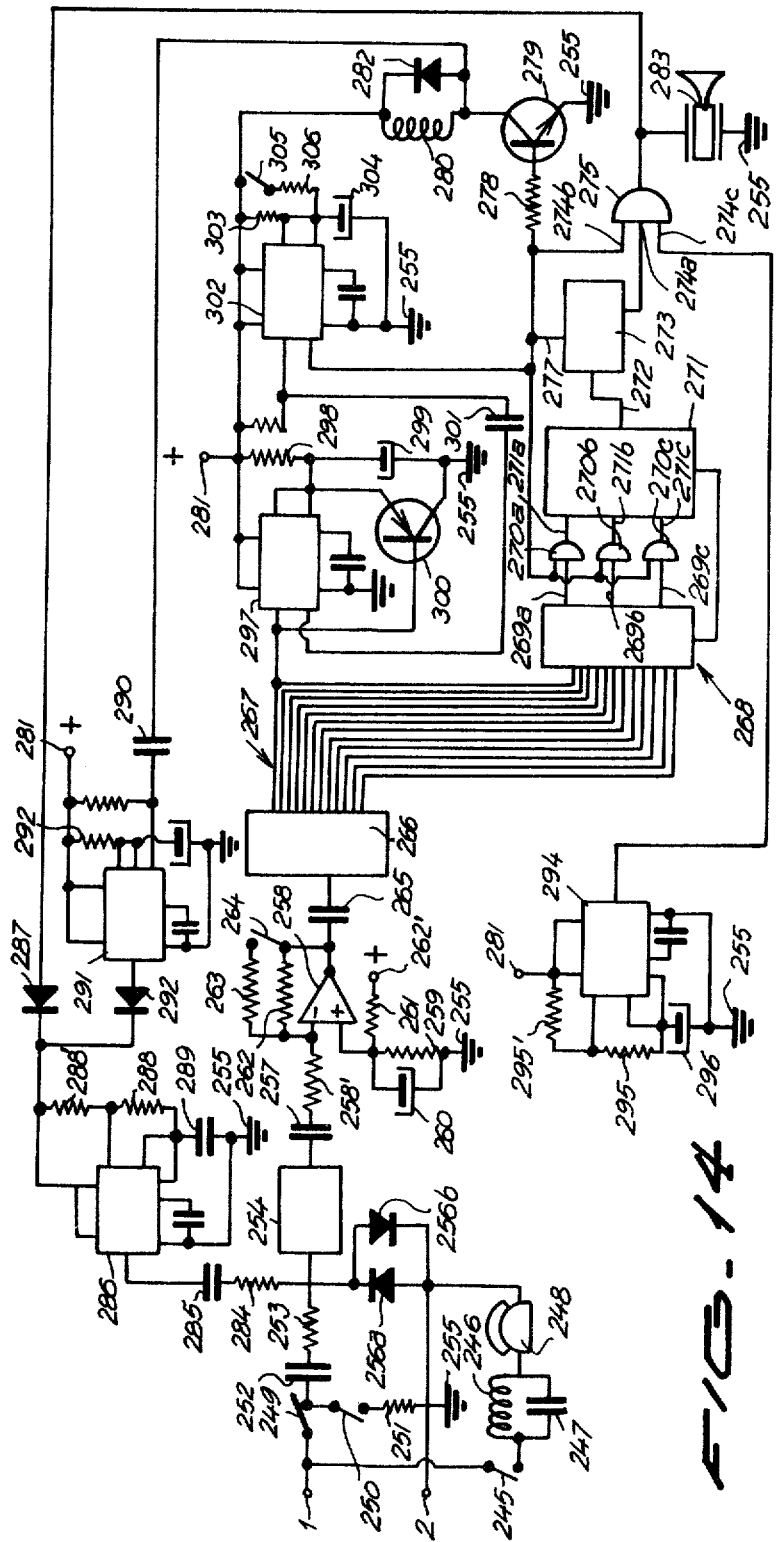

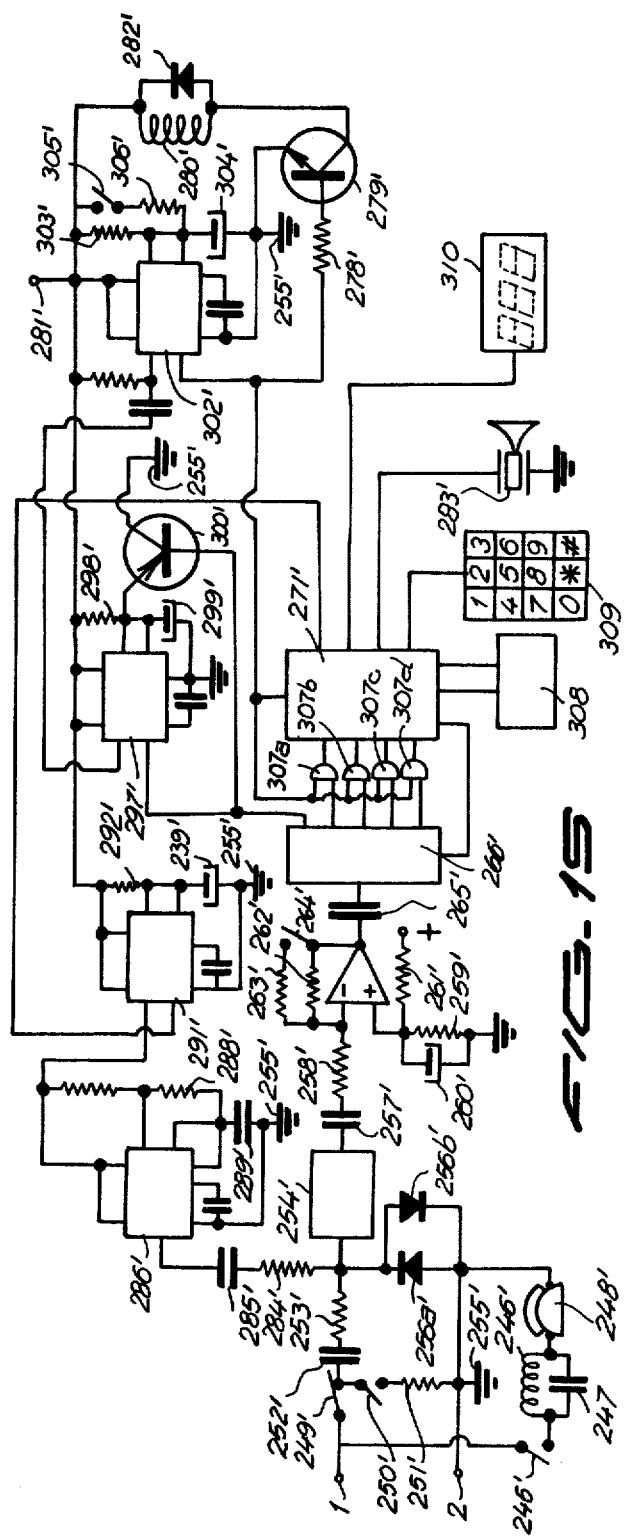

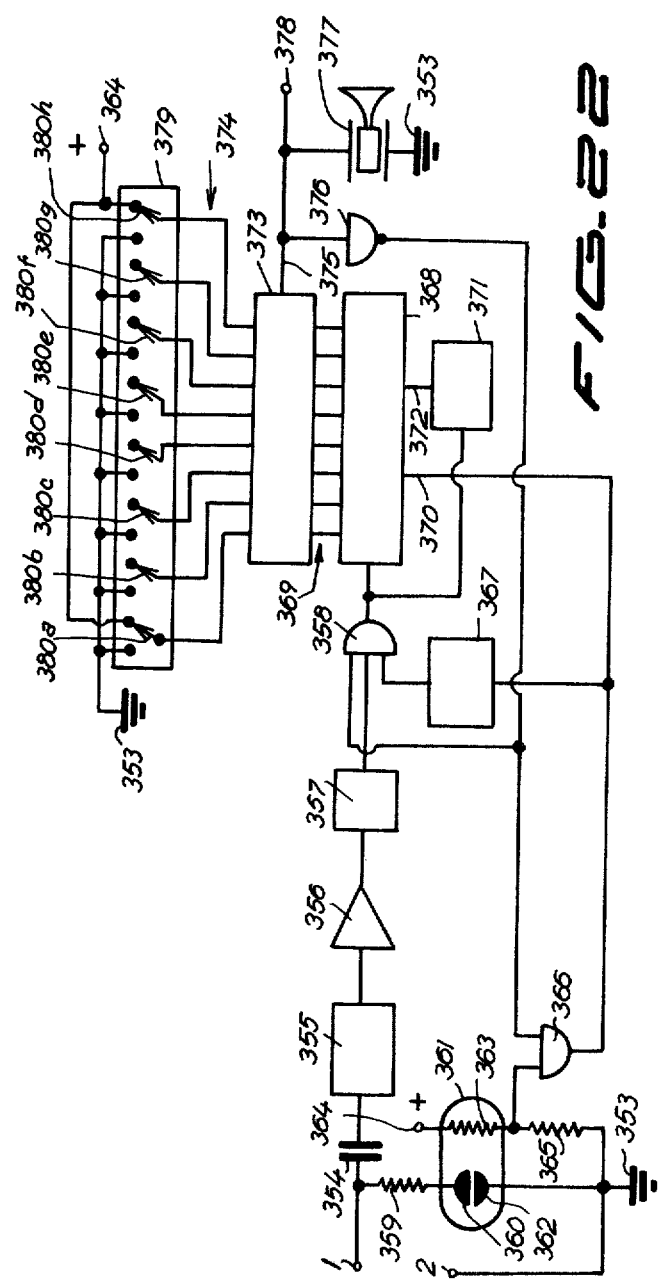

METHOD AND APPARATUS FOR PROCESSING CODED INFORMATION RECEIVED THROUGH A TELEPHONE LINE DURING THE INTER-RINGING PERIODS

BACKGROUND OF THE INVENTION

1. Field of the Invention

The present invention relates to a method and apparatus for processing coded information received through a telephone line during the inter-ringing periods. More particularly, the present invention relates to a method and apparatus allowing a called phone subscriber to know who the calling party is when his phone set receives a call followed by the reception of a pre-established code and before the called party answers the phone. The validation of the code received by the apparatus of the present invention may also be used to carry out several subsequent operations.

2. Description of the Prior Art

A phone subscriber is commonly pestered by innumerable unwanted phone calls, even in the small hours or when he is busy and he does not desire to be perturbed. Until now, no effective method is known to obviate such inconveniences. The most simple method used is to have a private exchange attended by an operator. However it may happen that the operator is not sure of the importance of the call; in such case the operator must assume the responsibility of transferring the communication, in which case said operator must interrupt the called party or, in the opposite case, look for an excuse for obviating said interruption. In this later case it may happen that the operator was wrong in evaluating the importance of the true urgency of the call. A device supposedly intended for obviating inconveniences of this sort is the automatic answering recorder. However, this kind of apparatus does not allow to know if the calling party is a desired one, before the latter hangs up. Such an apparatus is more useful for knowing which persons have called during a period of absence of the phone subscriber. Later on he may replay all the recorded messages which have been left by the calling parties during his absence. It is not practical to put in operation such an apparatus when the phone subscriber is present, because he can loose important or simply desired calls. It is also possible to resort to a company rendering answering services. While such services offer obviously several advantages, there are also various drawbacks. One of them is that the answering service retains the phone line of the phone subscriber during all the time the service is rendered. Another drawback is that the operators of such services become acquainted with the nature of the received messages and thus there is no privacy or secrecy. Still another drawback is that there is a considerable delay between the reception of the message by the answering service and the moment at which the called subscriber becomes acquainted therewith. Another device used by some phone subscribers to get privacy, and which is available on the market, is a simple switch which is connected in series with the circuit of the ringing bell of the phone set. When the switch is open, the bell will not sound and thus the phone subscriber will never become aware of the fact that the phone call is being made to him. This is obviously a very inconvenient method since the phone subscriber may miss one or more very important and/or urgent calls. The phone subscriber has no means to know if a call is being made and if the calling party may be or not a desired one. Another very important drawback is that if the phone subscriber forgets to close the switch when he desires to be again in conditions of receiving calls, he may remain incommunicated during several hours, or even days, without being aware of the fact.

SUMMARY OF THE INVENTION

According to the present invention there is provided a method and apparatus for processing coded information received through a telephone line during the inter-ringing periods, which has none of the drawbacks of the prior art.

The method and apparatus of the present invention allows the called subscriber to know, at the very instant at which the call is received, if the calling party is a desired one without the need of previously attending the call. Once he is aware if the calling party is a desired one he can still elect between answering the call or not.

This is made possible by the use of one or more pre-established codes previously given by him to desirable potential calling parties. If a desired calling party wants to make a call, he "dials" the phone number of the subscriber and, once the ringing loop has been established, he further "dials" one or more code characters during the inter-ringing periods. At the called end, once the ringing loop has been established, the apparatus of the called subscriber will receive and decodify the code characters, will compare them with pre-established codes accumulated in a suitable memory and will give out an indication that a call is being made and that it is originated by a desired calling party. The called subscriber, advertised by said indication, may then elect to answer or not the call, but in any case he has the knowledge that the called party is a desired one. If more than one-pre-established code is used, and according to certain embodiments of the invention, the apparatus may furthermore furnish a visible display of the code that has been received. Thus the called subscriber may know precisely who the calling party is. According to another embodiment of this invention, the indication provided by the apparatus in response to the reception of a pre-established code may be a differentiated acoustic signal, a light going on, or any other suitable means.

According to other embodiments of the present invention, the method comprises the sending, during an inter-ringing, by the calling party, of a first preamble code (which may comprise one or more characters), and, once the loop has been closed, the calling party can send a second code (which may comprise one or more characters). The apparatus of the present invention will receive and decodify said preamble code and compare it with one or more pre-established preamble codes stored in a suitable memory device and, if the coincidence between both received and memorized codes is met, it will validate the received code and send a ring-back signal the reception of which, by the calling party, will indicate to him that he may now send the second code, now with the loop closed. The apparatus will now compare the second code with one or more second codes stored in a second memory and if it finds coincidence between both codes it will validate the second code, and the validation signal may thus be used for different purposes. The double code system is specially useful in case of faulty phone lines, such as lines in which there is a high continuous or erratic noise level. In such instances, the calling party may send the character of the first code during all the length of one inter-ringing period. If the first code comprises more than one character, he may send the code at a rate of one character per each inter-ringing period and extending the sending of each character during the entire length of the corresponding inter-ringing period.

Thus, the general object of the present invention is to provide a method and apparatus for processing coded information received through a telephone line during the inter-ringing periods.

A more specific object is to provide a method and apparatus which will allow the phone subscriber to receive a phone call and to know if the calling party is a desired one.

Another object is to provide a method and apparatus of the kind referred to above which allows the phone subscriber to know not only if the calling party is a desired one, but also to know who this calling party specifically is.

Another object is to provide a method and apparatus of the kind referred to above which may be used to put in operation one or more electrically controllable devices simply calling the phone number of a receiving apparatus electrically associated with said devices and put them in out of operation by the sending of one or more pre-established codes.

Another object is to provide a method and apparatus of the kind referred to above which may be put in or out of operation at the subscriber's will.

BRIEF DESCRIPTION OF THE DRAWINGS

In the drawings:

FIG. 14 shows, partially in block form, a more sophisticated embodiment of an apparatus according to the present invention;

FIG. 15 shows, partially in block form, another possible embodiment of the present invention;

FIG. 22 shows an embodiment of the present invention which uses an optical coupler devices at its input stage.

DETAILED DESCRIPTION OF PREFERRED EMBODIMENTS

Figure 1:
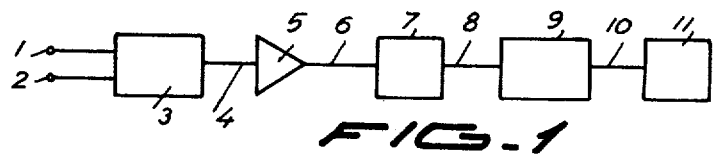
FIG. 1 is a schematic representation, in block form, of the most simple embodiment contemplated by the present invention and which will serve to describe the essential principles of the invention.

FIG. 1 illustrates, by means of a block diagram, the most simple way to put into practice the present invention. Terminals 1 and 2 represent the input terminals of the apparatus that will be coupled to the phone line corresponding to the phone (set) which it is desired to control. The apparatus comprises a filter 3, which is a bandpass filter having a cut-off frequency higher than the frequency of the ringing signal, and its passband being coincidental with the frequency of the pre-established code signal. Output 4 of filter 3 is coupled to the input of an amplifier 5 at the output of which only the frequencies corresponding to the pre-established code signal will appear, substantially amplified. Output 6 of amplifier 5 is coupled to the input of rectifying means 7 which rectify the amplified alternate code signals. Output 8 of rectifying means 7 is applied to triggering means 9 which, in the presence of the rectified signal, will activate indicating means 11, coupled to the output 10 of the triggering means.

As it has been mentioned above, the embodiment illustrated in FIG. 1 is the most simple of the embodiments considered as being within the scope of the present invention. As it is well known by those skilled in the art the "Touch-Tone" system, nowadays nation-wide used in the United States, operating the keys of a keyboard can provide twelve different pairs of signals, each one comprising two different frequencies. Each one of these pairs of frequencies represents a certain character. The simple embodiment illustrated in FIG. 1 is suitable for operating in response to the reception of only one character. That is to say, a code consisting by example only of the numerical character "4" may be used, or a code consisting of two or more characters "4" may be used, the characters being emitted in succession. An example may be the code "44" or the code "444". The basic character may be any of the characters 1 to 0, * or #, which are used with the keyboard of the "Touch- Tone" system. The condition is that all the characters of the code must be the same. One of the frequencies of the pair corresponding to the character must be the frequency for which the filter 3 has been designed, since filter 3 has a passband which is coincidental with only one of the two frequencies corresponding to the character selected for the code. Thus, the amplifying means 5 to amplify the frequency (of the received code signal) the passing of which has been allowed by filter 3. The signal appearing at output 6 of the amplifying means 5 is an a.c. which is rectified by the rectifying means 7, and the d.c. signal present at output 8 of the rectifying means 7 is applied to the triggering means 9, the output 10 of which is applied to the input of the indicating means 11. The triggering means 9 may be constituted, as an example, by a Schmitt trigger, while the indicating means 11 may be constituted by any suitable means intended to call the attention of the called subscriber in order to advise him that a call, together with the corresponding code, has been received. These indicating means may comprise, for example, a buzzer, a bell with a sound perceptibly different to the ring bell of the phone set proper, a lamp such as a flashing light emitting lamp, or the like.

Figure 2:
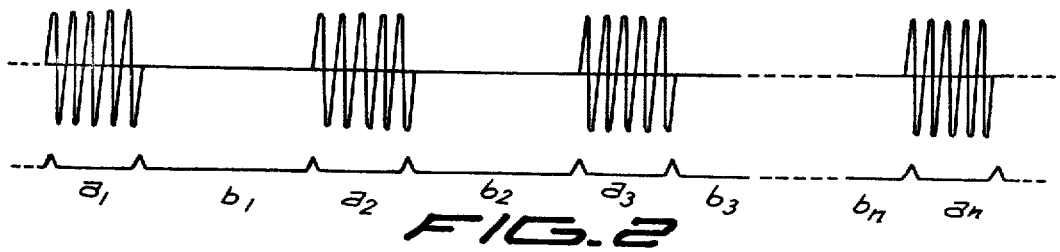
FIG. 2 is a diagram illustrating the waveform of the alternating current of the ringing signal, showing the active and inactive periods thereof.

Before describing in detail the operation of this embodiment, reference will be made to FIG. 2, which shows the wave trains of the ringing signal being sent by the telephone exchange in response to the establishment of the ringing circuit when the calling party has finished sending the phone number of the called subscriber, provided the called line is not busy and is in operative conditions. The active ringing period have been indicated $a_1, a_2 \ldots a_n$, whereas the non-active ringing periods have been indicated $b_1, b_2 \ldots b_n$.

It can be seen that during the active intervals $a_1, a_2 \ldots a_n$, the exchange sends wave trains of the ringing signal having a frequency depending on the nature of the equipment used at the exchange. At the United States, where the "dialing" system commonly named "Touch-Tone" has been standardized, the frequency of the ringing signal is 20 Hz all over the country, the length of the active ringing periods being 2 seconds and that of the non-active ringing periods 4 seconds. However, the values above mentioned may vary in different countries. As an example only, at the Argentine Republic the values are 16.6 Hz, 1 second, and 2 seconds, respectively.

The non-active ringing periods are the periods of time used according to the present invention, for sending the code signals that enable to characterize the calling party.

The "Touch-Tone" dialing system is based on the fact that, in order to characterize any one of the calling characters that are sent in response to the operation of a corresponding key of the keyboard, the calling phone set sends simultaneously two frequencies. The combination of these two frequencies particularizes the character. One of the frequencies is named "low frequency", while the other is named "high frequency". The table below indicates the two frequencies particularizing each character. In this table, L. F. indicates "low frequency" and H. F. indicates "high frequency".

| KEY | L.F. (Hz) | H.F. (Hz) |
|---|---|---|
| 1 | 697 | 1209 |
| 2 | 697 | 1336 |
| 3 | 697 | 1477 |

-continued

| KEY | L.F. (Hz) | H.F. (Hz) |
|---|---|---|
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1209 |
| * | 941 | 1336 |
| # | 941 | 1477 |

As an example only, it will be assumed that the character chosen for the code is the number 4. In order to establish the communication, the calling party "dials" in the ordinary way the phone number corresponding to the phone of the subscriber that he desires to call. Once the ringing signal circuit has been established, the calling party will hear at his receiver the ring-back signals equivalent to the ringing signals that the exchange sends during the active ringing periods $a_1, a_2 \ldots a_n$.

Once the calling party perceives said ring-back signals, he dials the character "4" during one or more of the non-active intervals $b_1, b_2 \ldots b_n$; that is to say, between two ringing signal trains. This means that two frequencies, a low one of 770 Hz and a high one of 1209 Hz shall be simultaneously transmitted from the calling phone set, through the phone line towards the exchange, through the equipment of the latter, and through the line to the called phone set. Therefore these two frequencies shall be applied to the input terminals 1 and 2 (FIG. 1) of the apparatus of the present invention. As an example only, it shall be assumed that filter 3 has a passband allowing the passage of only one of these frequencies, for example, that of 770 Hz. Therefore, at output 4 of filter 3 shall appear only signals of said frequency of 770 Hz during the corresponding one of the non-active intervals $b_1, b_2 \ldots b_n$. The level of the ring bell signals is comparatively high, not so the level of the vocal signals that shall be transmitted once the conversation circuit has been established; these later signals, applied to the input of amplifier 5, will have a very reduced amplitude, which explains the need of amplifying them. Thus, at output 6 of amplifier 5 shall appear a signal having said 770 Hz frequency which will be rectified by the rectifying means 7 at the output 8 of which a c.c. signal will appear that is applied to the input of the triggering means 9 at the output 10 of which appears a triggering signal that will activate indicating means 11. As it has been mentioned before, these indicating means may be of any desired and convenient kind; for example, an acoustic signal generated by a buzzer, a tone generator with its corresponding transducer, a bell with a sound easily differentiable from the sound of the subscriber's phone set ring bell, or a light indication furnished by a filament bulb, a light emitting diode, a neon light, or any other proper means that will warn the called subscriber not only of the fact that a phone call has been received but, also, that the calling party is someone who knows the code. When these indicating means are activated the called party may choose to answer or not the phone call. The skilled in the art shall understand that the subscriber's phone set proper is connected in parallel with the input terminals 1 and 2 corresponding to the phone line.

The embodiment illustrated in FIG. 1, notwithstanding being the most elementary of the ways conceived to put the present invention into practice, has several disadvantages, in spite of which it may find some useful uses. A first disadvantage lies in the fact that it lends itself for the use of only one code comprising only one character. Another disadvantage lies in the fact that, in response to the reception of the call at the called subscriber set, the ring bell of this latter will sound and it will stop sounding only when one of the two following circumstances arise: the called subscriber answers the communication or the calling party cuts the communication from its end.

In spite of this, in addition to the fact that the embodiment of FIG. 1 may find some useful uses, it serves most of all to explain the principles on which the present invention is based, that is to say:

(1) The use of at least one code that allows the called subscriber to know that the calling party is someone acquainted with said code;

(2) The sending of one or more code character signals during one or more of the non-active ringing periods; and (3) The way of separating the code signals from the ringing signals, both consecutively present at the line when the call circuit has been closed and the code signals have been sent.

More elaborate embodiments eliminating the drawbacks above mentioned shall be described next.

Figures 3, 4:
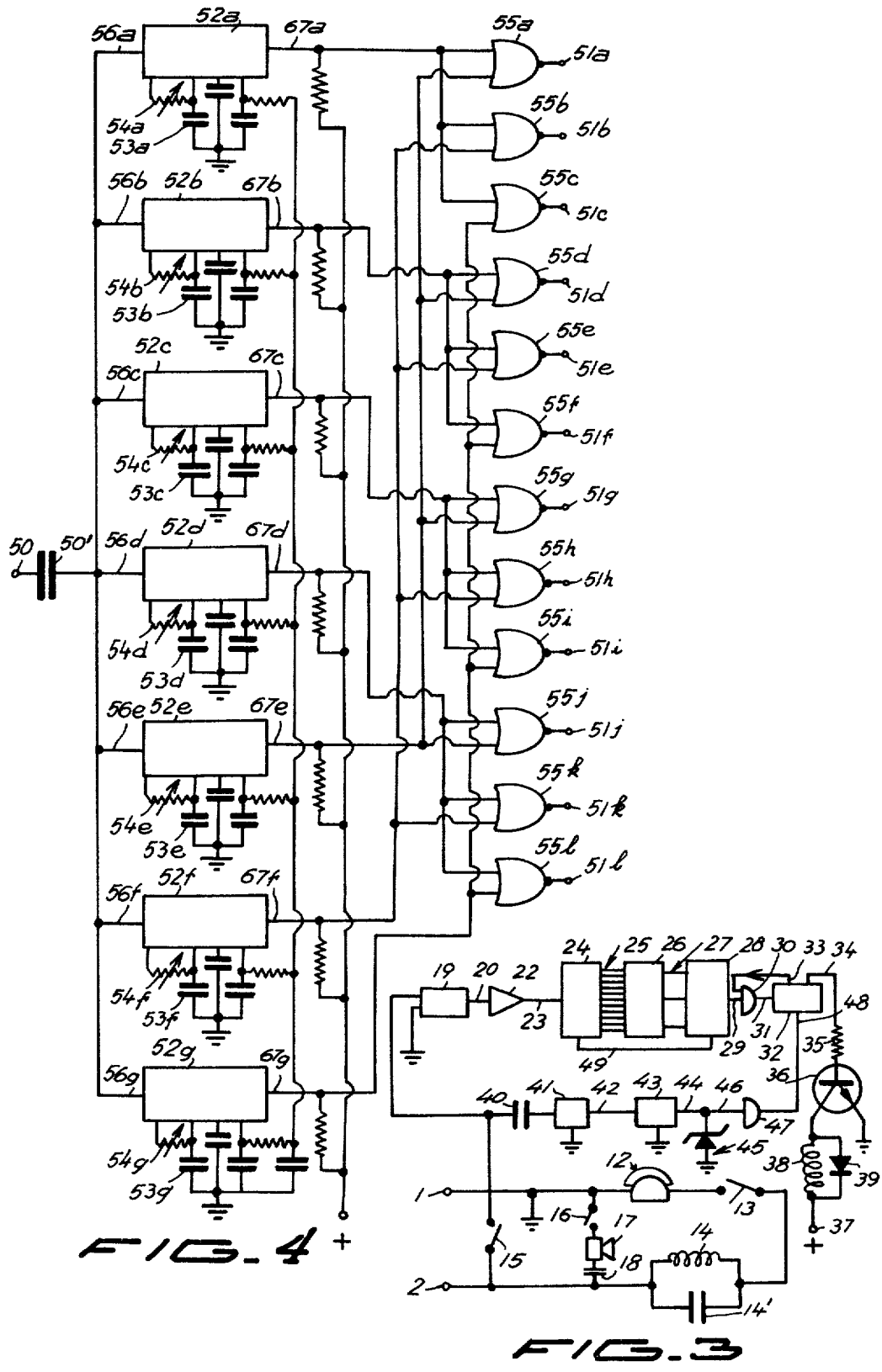
FIG. 3 shows in block form a more elaborated embodiment of the invention.
FIG. 4 shows, partially in block form, a possible embodiment of the tone decoding means usable in different embodiments of this invention.

In FIG. 3 is shown an embodiment of the present invention that is more elaborated than that of FIG. 1. This embodiment comprises two input terminals 1 and 2 that will be connected to the phone line. The phone set 12 of the called subscriber is connected on the input terminals 1 and 2 in series with a manually actuatable switch 13 and the energizing coil 14 of relay that has a normally closed contact 15. A capacitor 14' is connected in parallel with coil 14. In parallel with terminals 1 and 2 is also connected a series circuit comprising a normally open relay contact 16 indicating means 17 (in the illustrated example, these are acoustic means comprising for example a buzzer), and a capacitor 18.

The input terminal 2 is also coupled, through the normally closed relay contact 15, to the input of band-pass filter means 19, for blocking the ringing signal passage and at the same time allowing the passage of any signal having a frequency corresponding to any of the frequencies used in the "Touch-Tone" system, therefore substantially than that of the ringing signal; in other words, a frequency substantially comprised between 697 and 1477 Hz.

It can be also a high-pass filter having a cut-off frequency lower than 697 Hz but higher than the ringing signal frequency; however a band-pass filter is preferred due to the fact that it allows to prevent the passage of vocal frequencies or parasite signals induced in the line during the ringing period. Output 20 of filter 19 is coupled to the input of the amplifying means 22. These latter are necessary due to the fact that the ringing signal, generated at the exchange, has a comparatively high intensity, as well as the vocal signals sent during the communication, while the code character signals sent during the non-active ringing periods arrive at the apparatus of the present invention with very reduced intensity. Therefore, duly amplified code character signals will appear at output 23 of amplifying means 22. The signals appearing at the output 23 are applied to the input of decoding means 24 for converting the code character frequencies into digital signals. In other words, when the calling party "dials", for example, a code signal represented by the numerical character 4, the apparatus of FIG. 3, will receive at the same time the two signals having frequencies of 770 and 1209 Hz. Decoder 24, in response to the presence of these frequencies, will activate that of its outputs 25 corresponding to digit 4. In other words, for each received combination of two frequencies, one of the twelve outputs 25 of the decoder 24 corresponding to the "dialing" of the corresponding key of the "Touch-Tone" system, will be activated. If the code comprises three characters, which of course shall be emitted and received in succession, three of the outputs 25 corresponding to the "dialed" characters will be activated also in succession. It may happen that the code comprises a three digit number where one of the digits is repeated; for example number 228. In this case, the output 25 corresponding to digit 2, will be activated, thereafter the one corresponding to digit 2 and then the one corresponding to digit 8. In the case that the three character code comprises three identical digits, for example 222, the output 25 corresponding to digit 2 will be successively activated three times. The skilled in the art shall understand that the code may comprise whichever amount of characters. If the code comprises six characters, six of the corresponding outputs 25 will be successively activated. The twelve outputs 25 are coupled to an equal number of respective inputs of code selecting means 26, the function of which is to allow the passage of only the characters constituting the agreed code. The code selecting means may be of the permanent pre-adjusted type or of a type allowing the user of the apparatus to change the code at will. In the latter instance, and assuming that the code used is a three character code, the code selecting means 26 may be constituted by three selector switches of twelve positions each, as will be seen in detail later. Each selecting means 26 have a moving contact connected to a corresponding output 27. Assuming always that the chosen code comprises three characters, selecting means 26 shall have three outputs 27. Instead, if the selected code comprises for example, five characters, the selecting means 26, in the instance of manually actuatable selector switches, will have five switches and correspondingly five outputs 27. Going on with the example of the three character code, the three outputs 27, will be coupled to an equal number of corresponding inputs of sequence decoding means 28. These sequence decoding means 28 have the function of validating the digits applied at its input only in case said digits go into the sequence decoding means in the order pre-established for the code and within a pre-established period of time. In case these conditions are fulfiled, the sequence decoding-means 28 will emit at its output 29 a pulse which is applied to one of the inputs of an AND gate 30. Output 31 of gate 30 is applied to the clock input of flip-flop means 32. Output $\bar{Q}$ 33 is coupled to the other input of gate 30. Output Q 34 of flip-flop 32 is coupled, through a resistor 35, to the base electrode of a transistor 36. The colector electrode of transistor 36 is connected to a conventional power supply 37 through the energizing coil 38 of a relay which controls the normally open contact 16. In parallel with the energizing coil 38 is connected a protecting diode 39. The input terminal 2 is also coupled, through a capacitor 40, to rectifying means 41. When, through the phone line, the ringing signals enter into the apparatus before any code signal has been sent, said ringing signals will be rectified by the rectifying means 41. The rectified a.c. that appears at output 42 of the rectifying means 41 is applied to a filter 43 for smoothing out the level differences between the active and the inactive periods of the ringing period in such a way that, at the output 44, there will appear a reasonably constant voltage.

In order to duly stabilize this voltage a Zenner diode 45 is connected into the circuit. The a.c. appearing at 46 is applied to triggering means 47 that may be, for example, a Schmitt trigger. The output of the triggering means 47 is applied to the clear input 48 of flip-flop 32. Thus, the flip-flop 32 shall remain reset during the entire ringing period. The tone decoding means 24 may have an output 49, that, when any digit appears at output 25, produce the erasing of the information contained in the sequence decoding means 28 when a corresponding information does not arrive simultaneously to one of the inputs 27. In such a case the transistor 36, and therefore the indicating means 17, will not be activated by the code and the calling party shall have to send the code again, this time properly.

As an example, a call operation shall be describe next.

The calling party "dials" the phone number of the subscriber he wants to call. In response to this, the exchange will establish the call circuit and send ringing signal to the receiver of the called party and, at the same time, to terminals 1 and 2 of the apparatus of FIG. 3. The manual switch 13, being open, the phone set 12 of the called subscriber is not connected to the line, and as the coil 14 will not be energized either, contact 15 will remain closed. Therefore, the ringing signal will be applied to the input of filter 19, that rejects it. At the same time the ringing signal will be applied to a rectifying means 41, which will transform it into a pulsing discontinuous current. This current, applied to the filtering means 43, will be transformed into a substantially non-pulsing current by the capacitances of filter 43 and will tend to remain constant at output 44 even during the non-active periods of the ringing signal. This continuous signal is stabilized to a constant value by the Zenner diode and is applied to the triggering means 47 that will supply an output signal enabling the flip-flop 32. In the meantime, when the calling party has heard that the exchange is sending the ringing signals, indicating that the ringing circuit has been established, dials, the characters corresponding to the code during at least one non-active period of the ringing period. The frequencies thus sent appear on the input of the filtering means 19 that will allow them to pass and are then amplified by the amplifier 22. The output of said amplifier is applied to tone decoding means 24 that transform each successive pair of frequencies into a digit appearing on a corresponding output 25. If the digit pertains to one of the pre-established codes, the code selecting means will allow it to pass, activating a corresponding one of the outputs 27. This process will be repeated for each of the code characters. If the sequence decoding means 28 receive the digits from the outputs 27 in the order corresponding to the pre-established code and within a pre-established time, they will emit a pulse which will be applied to one of the inputs of the AND gate 30 that will send a pulse which is applied to the clock input 31 of the flip-flop 31, this latter changing its state. At the same time, this flip-flop, through its output $\overline{Q}$ 33, applies to the other input of the AND gate 30 a signal that will block the gate, preventing the passage of any subsequent pulse. On the other hand, the change of state of the flip-flop makes also that at its output Q 34 appears a pulse that makes conducting the transistor 36 activating the energizing coil 38 of the relay, the normally open contact 16 of which closes and energizes the indicating means 17, that will supply the indication that a call with the agreed code has been received. The called subscriber may choose now to answer the phone call or not. If he decides to answer it, he closes the switch 13, thus connecting his phone set 12 to the input terminals 1 and 2, energizing at the same time coil 14 of the relay the normally closed contact of which opens disconnecting from the phone line, the entire electronic control apparatus, after which the desired communication may be established.

It can happen that the call is not answered, which may be due to the fact that the called subscriber doesn't want to answer or, simply, because he is not at home and can not do it so that the manually actuatable switch 13 will remain open. In order to prevent the calling party from making too long its call keeping the line busy the apparatus of FIG. 3 may be furnished with an automatic release device. This device releases the line after a pre-established number of ringing signal trains have been received by the apparatus, that is to say after a pre-established number of active ringing periods. For example, it may release the line after nine ringing signal trains have been received. The details of this automatic release device shall be described later, the device being usable in other embodiments of the present invention.

Summing up the practical aspects of the embodiment of FIG. 3, the step sequence of a call comprises the following:

(a) The calling party "dials" the phone number of the subscriber he wants to call;

(b) On perceiving at his receiver that the exchange is sending the ringing signal, he "dials" the code characters during one or more non-active periods of the ringing signal. If the code is the right one and it has been properly "dialed", the indicating means 17 of the apparatus of the present invention will advise that a call is present at the line and that the right code has been received; and (c) The called subscriber:
  (1) closes the switch 13 and answers the call; or
  (2) does not answer the call and the switch 13 remains open.

In the second instance, the automatic release device, (if the apparatus is furnished with one) releases the line after a pre-established number of ringing signal trains have been received.

The block diagram of FIG. 3 is based on the assumption that for the tone decoding means 24 and for the sequence decoder means 28 specialized integrated circuits will be used, that is to say, specially designed and manufactured to perform the desired functions. Of course, it is possible to replace each one of these integrated circuits with non specialized integrated circuits or discrete components.

For example, the tone decoding means 24 of the embodiment shown in FIG. 3 may comprise the equivalent circuit illustrated in FIG. 4. Terminal 50 is the input terminal of the tone decoder that is coupled to the output 23 of the amplifying means 22 (FIG. 3). Terminals 51a to 51l are the output terminals, each one corresponding to a code character, being indicated in FIG. 3 as outputs 25 of the tone decoding means 24.

Through a capacitor 52 the input terminal 50 is coupled in parallel to the inputs of seven tone decoders 52a to 52g.

As it has been explained above in the "Touch-Tone" type "dialing" system, four frequencies denominated low and three frequencies denominated high are used.

The combination per pairs of these seven frequencies offers twelve different possibilities. The function of the tone decoders is precisely to convert each pair of frequencies into a corresponding digit. Each one of the tone decoders 52a to 52g is adjusted for response to one of the corresponding frequencies of the "Touch-Tone" system. The accurate adjustment to the desired frequencies is achieved through the combination of a fixed capacitor 53a and a variable resistor 54a in the case of the tone decoder 52a. The other tone decoders 52b to 52g are adjusted in the same way. The outputs of tone decoders 52a to 52g are applied, under the corresponding combinations, to the inputs of NOR gates 55a to 55l. The output of each one of these gates corresponds to a respective output terminal 51a to 51l of the decoder.

The following table allows to visualize easily the operations performed by the tone decoding means in response to different pairs of frequencies applied to the input terminal 50. For each pair of frequencies, corresponding to a character "dialed" by the calling party, are indicated the activated tone decoders 52, the NOR gate 55 activated by said decoders, the output terminal 51, at which the output signal appears, and the code character represented by this output.

| Frequencies applied to terminal 50(Hz) | Involved tone decoders | Activated NOR gate | Activated output | Code character represented |
|---|---|---|---|---|
| 697 | 52a | 55a | 51a | 1 |
| 1209 | 52e | | | |
| 697 | 52a | | | |
| | | 55b | 51b | 2 |
| 1336 | 52f | | | |
| 697 | 52a | | | |
| | | 55c | 51c | 3 |
| 1477 | 52g | | | |
| 770 | 52b | | | |
| | | 55d | 51d | 4 |
| 1209 | 52e | | | |
| 770 | 52b | | | |
| | | 55e | 51e | 5 |
| 1336 | 52f | | | |
| 770 | 52b | | | |
| | | 55f | 51f | 6 |
| 1477 | 52g | | | |
| 852 | 52c | | | |
| | | 55g | 51g | 7 |
| 1209 | 52e | | | |
| 852 | 52c | | | |
| | | 55h | 51h | 8 |
| 1336 | 52f | | | |
| 852 | 52c | | | |
| | | 55i | 51i | 9 |
| 1477 | 52g | | | |
| 941 | 52d | | | |
| | | 55j | 51j | 0 |
| 1209 | 52e | | | |
| 941 | 52d | | | |
| | | 55k | 51k | * |
| 1336 | 52f | | | |
| 941 | 52d | | | |
| | | 55l | 51l | # |
| 1477 | 52g | | | |

An LM 567 type or similar integrated circuit may be used for tone decoders 52a to 52g. NOR gates 55a to 55l may be 74 C 02 type or similar. These later integrated circuits comprise four gates each one. That is to say, one of the integrated circuits will comprise gates 55a to 55d; a second IC of this kind will comprise gates 55e to 55h; and a third one of these ICs will comprise gates 55i to 55l. It is understood that the mention of specific ICs is given just as an example.

Figure 5:
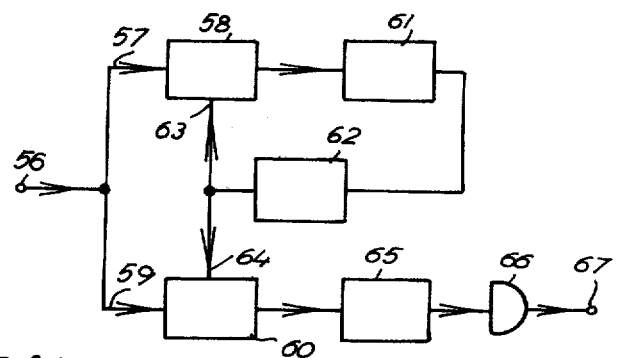
FIG. 5 shows in block form an embodiment of the tone decoders used in the embodiment of FIG. 4.

FIG. 5 shows a block diagram illustrating the circuit corresponding to each one of tone decoders 52a to 52g of FIG. 4. Each decoder comprises an input terminal 56 that is coupled, on one side, to a first input 57 of a phase comparator 58 and also to a first input 59 of a quadrature detector 60. The output of phase comparator 57 is coupled to the input of a low-pass filter 61 the output of which is coupled to the voltage control input of a voltage controlled oscilator 62. The output of oscilator 62 is coupled also to a second input 63 of the phase comparator and also to a second input 64 of the quadrature detector 60. The output of said quadrature detector 60 is coupled to the input of a second low-pass filter 65 the output of which is coupled to the input of a Schmitt trigger 66, the output of which, represented by output terminal 67, corresponds to one of the inputs 67a to 67g of the tone decoders 52a to 52g of FIG. 4.

The operation of this decoder is as follows. On the input terminal 56 is applied the pair of frequencies representing the code character to be decoded and these frequencies are applied to a phase comparator 58. At the same time, the output of the oscilator 62 is coupled to the phase comparator 58. It will be understood that the oscilator 62 will be designed basically to generate one of the two frequencies of a pair, corresponding to a code character; however the frequency of oscilator 60 may differ slightly from the frequency of the received tone to be decoded. Phase detector 58 compares the frequencies received from the input 56 and the oscilator 62 and produces an output, which is proportional to the different frequency applied to the low-pass filter 61. The output of this latter is applied to the voltage correction input of oscilator 62, correcting its frequency in order to match it with the frequency of the input signal received on the input terminal 56. The signal received on this terminal 56 is applied to the quadrature detector 60 that receives the frequency generated by the oscilator 62 and at the same time, detects the phase error between the two frequencies applied to said detector. If this error is very small (which is the condition for producing the phase locking condition), a low state will appear at the output of the quadrature detector 60. This low state will be filtered by the low-pass filter 65 and will be finally applied to trigger 66, that will square this signal. Therefore, the output on terminal 67 will be the tone decoding indication that will be applied to the input corresponding to the associated gate NOR 55 (see FIG. 4). It will be understood that, actually, the pairs of frequencies corresponding to different code characters will successively appear on input 56. Nevertheless, in respect to those frequencies not taken into consideration in the design of oscilator 62, they will generate at the input of filter 59 frequency products which are too far from the frequency desired for this particular encoder and therefore will be rejected by filter 61. In its turn, the quadrature detector 60 will not produce the signal required at the output terminal 67. The skilled in the art will easily understand that in order to implement these tone decoders, it is possible to resort to different designs fulfilling the same function and the present invention is not to be considered restricted to the specific design of FIG. 5, that has been given just as an example to explain in a better way, the operation of the decoding means 24 of FIG. 3 of other embodiments to be described and illustrated later.

Figure 6:
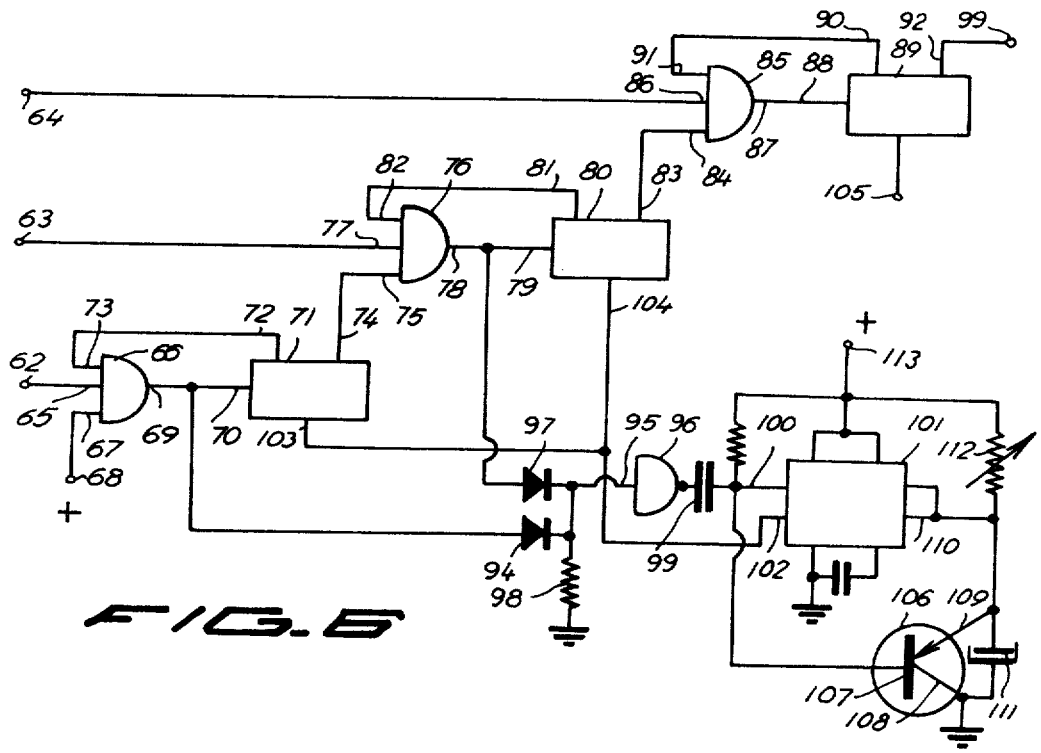
FIG. 6 shows one of the possible embodiments of the sequence decodifying means usable in the arrangement of FIG. 3 and also in other embodiments of the invention.

Referring again to FIG. 3, sequential storage means 28 may be constituted by a "Telaris 7511" type or similar integrated circuit. In FIG. 6 are shown, as a block diagram, the circuits comprised by sequential storage means 28, the "AND" gate 30 and flip-flop 32. Input terminals 62, 63 and 64 indicated in FIG. 6, are those to be applied to outputs 27 of code selecting means 26. Input terminal 62 is connected to one of inputs 65 of an "AND" gate 66. Another input 67 of these gates is connected to the positive supply potential represented in FIG. 6 by terminal 68. Output 69 of gate 66 is coupled to the clock input 70 of a flip-flop 71. Output 72 $\overline{Q}$ is coupled to the third input 73 of the "AND" gate 66. Output 74 Q of flip-flop 71 is applied to a first input 75 of another "AND" gate 76, while the second input 77 of said gate corresponds to input terminal 63. Output 78 of the "AND" gate 76 is coupled to the clock input 79 of a second flip-flop 80, the output $\overline{Q}$ 81 of which is coupled to the third input 82 of "AND" gate 76. The other output Q 83 of flip-flop 80 is coupled to a first input 84 of a third "AND" gate 85, the second input 86 of which corresponds to input terminal 64. Output 87 of the third "AND" gate 85 is coupled to the clock input 88 of a third flip-flop 89, the output $\overline{Q}$ 90 of which is coupled to the third input 91 of "AND" gate 85. Output 92 of flip-flop 89, represented by terminal 93, corresponds to output 34 of flip-flop 32 of FIG. 3.

Output 69 of the first "AND" gate 66 is also coupled, through a diode 94, to the input 95 of a gate 96. Output 78 of the second "AND" gate 76 is also coupled, through a diode 97, to the same input 95 of gate 96, being this input 95 connected to ground through a resistor 98. The output of gate 96 is coupled, through a capacitor 99, to input 100 of a retriggerable type monostable multivibrator 101. Output 102 of multivibrator 101 is simultaneously applied to enabling inputs 103 of flip-flop 71 and 104 of flip-flop 80. The enabling input 105 of flip-flop 89 corresponds to input 48 of flip-flop 32 in FIG. 3. A transistor 106 has its base electrode 107 coupled to input 100 of multivibrator 101, being its bussing electrode 108 connected to ground. The emitter electrode 109 is couples to a controlling input 110 of multivibrator 101. An electrolytic capacitor, which establishes a time constant, is connected between bussing electrode 108 and emitter electrode 109.

The lay-out illustrated in FIG. 6 works as follows:

It will be assumed that the code selector sends a pulse representing the first code character, which is therefore applied to input 65 of gate 66; this pulse is a high one. Input 67 of gate 66 has also a "high" applied through terminal 68 connected to the positive potential of the power supply. Since the three flip-flops 71, 80 and 89 are in the reset (or) re-established state, output 72 of flip-flop 71 will also apply a "high" to the third input 73 of gate 66. Since the three inputs 65, 67 and 73 of gate 66 have corresponding "highs" applied, the coincidence will make that at output 69 of gate 66, appears a high that will be applied, through diode 94, to inverter 96 at the output of which will appear a "low" that, through capacitor 99 will be applied to input 100 of retriggerable monostable 101. The corresponding output 102 will be activated, annuling the reset signal, to the corresponding inputs 103 and 104 of flip-flops 71 and 80, in such a way that, when the signal applied to terminal 62 goes from high to low, flip-flop will change its state and its output $\overline{Q}$ 72 will send a "low" pulse, that, when being applied to input 73 of gate 66, will block this later in respect to any subsequent signal applied to terminal 62. It must be noted that capacitor 111 is charged through resistor 112 with the positive potential applied to terminal 113 by the power supply. When a pulse is applied to input 100 of the monostable said pulse is also applied to base electrode 107 of transistor 106, bringing about its conduction. Therefore, capacitor 111 will be shorted by the transistor and will get discharged. Since the pulse appearing at input 100 is very short, transistor 106 immediately stops conducting and capacitor 111 will begin again to charge according to time constant settled by the resistor value and the capacitance value of resistor 112 and capacitor 111, respectively. The retriggerable monostable 101 will remain in its triggered state as long as capacitor 111 remains discharged enough, and therefore flip-flops 71 and 80 will remain enabled up to the moment when the charge of capacitor 111 suffices in order to make retriggerable monostable 101 turn into its original state. This latter will happen after a pre-established interval of time t/n. The device is then ready to receive at its input 63, the pulse corresponding to the second code character. If this second code character takes a time longer than in appearing at terminal 63, capacitor 111 will get charged to the level required for making retriggerable monostable 101 turn into its original state, in which case its output 102 will send a reset signal to flip-flops 71 and 80. This signal will make that at output 72 of flip-flop 71 appears a "high" that will be applied to input 73 of gate 66, thus enabling it. At output 74, a "low" will show up, that will be applied to input 95 of gate 76, blocking it. If a pulse corresponding to the second code character goes into terminal 63, at input 77 of gate 76 a "high" will appear, that will appear at output 78 of gate 76, that, through diode 97, will be applied to input 95 of inverter 96, thus appearing at the output of this later a "low", which will retrigger monostable 101. On the pulse going from "high" to "low" at terminal 63, flip-flop 80 will perceive this transition, therefore changing its state, appearing at its output $\overline{Q}$ 81 a "low" state that will be applied to input 82 of gate 76, blocking it, and appearing at output 83 of said flip-flop a "high" state that will be applied to input 84 of gate 85, thus enabling it. If the pulse corresponding to the third code character goes into terminal 64 within time t and provided the flip-flop receives at its input 105 an enabling signal, said flip-flop 89 will change its state, thus appearing at its output 90 a "low" state that will be applied to input 91 of gate 85, blocking it, and through output Q 92 of said flip-flop, will appear a "high" state that, applied to terminal 93, will represent the code validation. This validating signal will remain until the moment when a reset signal shows up at input 105 of flip-flop.

Following what has been explained in reference to FIGS. 4, 5 and 6, it can be seen that the complete process requires the following conditions. The code received in the form of a pair of frequencies must be decoded at decoding means 24 in order to turn said pairs of frequencies into corresponding characters. In second place, code selecting means 26 must confirm that the characters composing the code are those actually agreed. In third place, the sequential selecting means 28 must validate the sent code, what they will do only in case the three (in the example) code characters enter in the sequence corresponding to the code and in case the three characters have arrived with time gaps between them no longer than a pre-established time.

Figure 7:
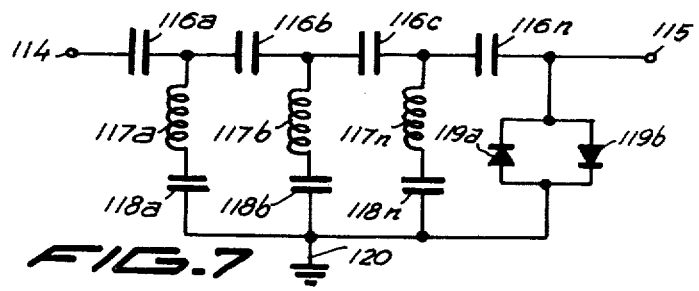
FIG. 7 is a schematic diagram showing one of the possible embodiments of the input stage usable in several of the embodiments of the present invention.

In FIG. 7 is shown one of the possible ways to realize input stage 19 of FIG. 3, that has the function of blocking the low frequency voltage generated by the phone central office, and that serves to activate ring bell mechanism, allowing at the same time the passage, without alterations, of the tones corresponding to the code characters that may be sent by the phone set of the calling party during the ring bell non-active periods. In this way of realization of input stage 19, said stage comprises a high-pass filter of elliptical function type (CAUER) of three zeros, with a cut-off frequency of about 650 Hz, that is to say, a frequency lower, but near to the lowest tone frequency of "Touch-Tone" system. Input terminal 114 represents the input terminal to input stage 19 of FIG. 3, while output terminal 115 corresponds to output 20 of stage 19. As it is known, this type of filters comprises in series capacitances 116a, 116b, 116c . . . 116n connected in series, and inductances 117a, 117b . . . 117n, that have one of their ends connected to a corresponding one of junction points between two consecutive capacitances. The other end of each one of inductances 117a to 117n, is connected to ground through a corresponding capacitance 118a, 118b . . . 118n. Since at filter output 115 may show up over-voltage pulses, capable of affecting the following electronic circuits, a pair of protective diodes 119a and 119b are connected in parallel between them, but in reverse polarities relation, between output 115 and ground 120.

Figure 8:
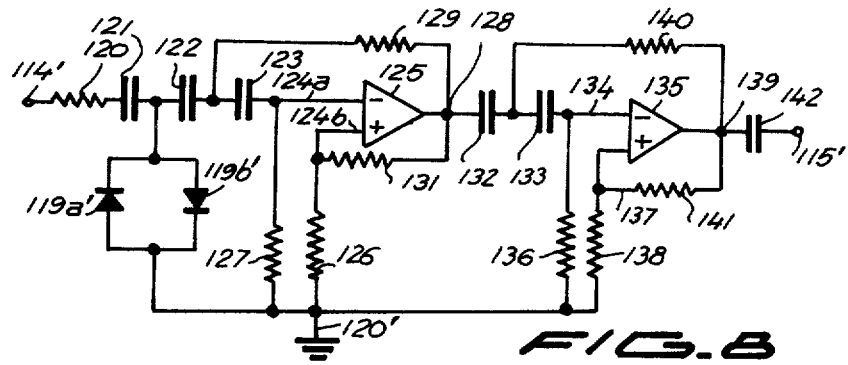
FIG. 8 shows another possible embodiment of such an input stage.

In FIG. 8 is shown another type of input stage that is also suitable for stage 19 of FIG. 3. As in the case of the filter of FIG. 7, the aim is to block the passage of the ring bell low frequency voltage, allowing at the same time the passage of code signals without alterations. Input 114' is coupled through resistor 120 and three capacitors 121, 122 and 123 to a first input 124a of an operational amplifier 125, the second input 124b of which is connected to ground through a resistor 126. The first input 124a of amplifier 125 is also connected to ground through a resistor 127. It is also provided a device protecting against over-voltage pulses, that could affect the subsequent electronic circuits, that comprises two diodes 119a' and 119b', connected in parallel between them and the assembly is connected between the junction point of capacitors 121 and 122 and ground 120'. Between the junction point of capacitors 122 and 123 and output 128 of amplifier 125, a resistor 129 is connected, while, between the second input 124b of amplifier 125 and output 128 of said amplifier, a resistor 130 is connected. Output 128 of amplifier 125 is connected, through two capacitors in series 132 and 133, to a first input 124 of a second operational amplifier. The first input 134 of this amplifier is connected to ground 120' through a resistor 136, while the second input 137 of amplifier is connected to ground 120' through a resistor 138. Output 139 of amplifier 135 is connected to a junction point between capacitors 132 and 133 through a resistor 140, while said output 139 is also connected to the second input 137 of amplifier 135 through resistor 141. The output terminal 115' is coupled to output 139 of amplifier 135 through a capacitor 142.

The operational amplifiers 125 and 135, with their associated elements, constitute a high-pass filter, which is a variant adapted from the one proposed by Sallen and Key, and the constants are calculated to supply a cut-off frequency of about 650 Hz.

Figure 9:
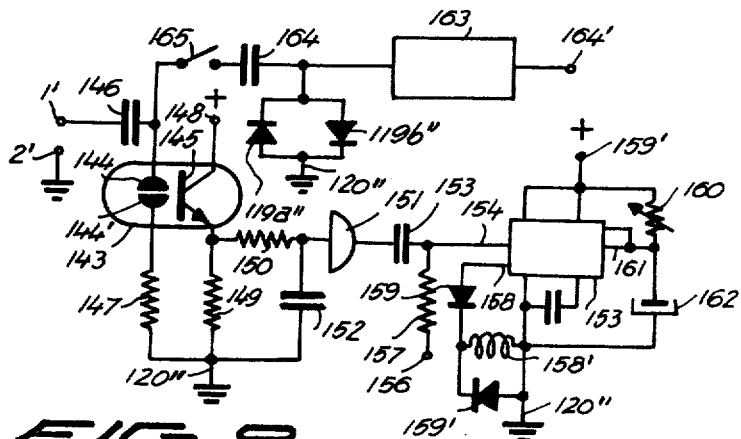
FIG. 9 shows a third embodiment of an input stage.

In FIG. 9 is still shown a third possible way of realization that is suitable for the input stage 19 (FIG. 3). Input terminals 1' and 2' correspond to terminals 1 and 2 of FIG. 3, and therefore, will be connected to the subscriber's phone line. The device comprises an optical coupler 143 that is constituted by a neon light 144 and a phototransistor 145. One of the electrodes of neon light 144 is coupled to input terminal 1' through a capacitor 146, while the other electrode of the neon light is coupled to ground 120" through a resistor 147. The bussing electrode of phototransistor 145 is connected to the positive of a power supply at terminal 148, while the emitting electrode of said phototransistor is connected to ground 120" through a resistor 149. The emitting electrode of phototransistor 145 is connected, through a resistor 150, to the input of Schmitt trigger 151, or other equivalent trigger. Said input of trigger 151 is derived to ground 120" through a capacitor 152. The output of trigger 151 is coupled through a capacitor 153 to the clock input 154 of a monostable multivibrator 155, being this input 154 also connected to the positive of terminal 156 power supply through a resistor 157. Output 158 of multivibrator 155 is coupled, through a diode 158, to the energizing coil 158' (equivalent to coil 38 of FIG. 3) the other end of which is connected to ground 120". A diode 158" (equivalent to diode 39 of FIG. 3) is connected in parallel to coil 158'. Multivibrator 155 is fed from terminal 159', connected to the positive of the power supply. A time constant circuit, constituted by a variable resistor 160, connected between positive terminal 159' and control input 161 of multivibrator, is provided. An electrolytic capacitor 162 is connected between the control input 161 and ground 120".

To capacitor 146 is also connected one of the ends of a normally closed contact 165, the other end of which is coupled to the input of a high-pass filter 163 through a capacitor 164, that has a cut-off frequency of about 650 Hz, and that may be implemented through one of the lay-outs of FIGS. 7 or 8, or same other equivalent lay-out. The output of filter 163 is connected to a terminal 164' that corresponds to output 20 of filter 19 of FIG. 3.

The performance of this lay-out is as follows:

When a calling party "dials" the phone number of the called suscriber, and once the ring bell circuit is established by the central office, the voltage of the ring bell signal is applied, through a capacitor 146, to one of the electrodes 144 of the neon light contained in the optical-electronic coupler 143. The potential difference between electrodes 144 and 144' produces the energizing of neon gas, that generates a luminescence energizing photoelectric transistor 145. The emitting electrode produces a pulsing signal that is leveled by the filter constituted by resistor 150 and capacitor 152 and the signal thus leveled is applied to the input of Schmitt trigger 151. Since switch 165 is constituted by a normally open contact of a relay, the ring bell signal voltage going into terminals 1' and 2' is not applied to the input of filter 163. When the first ring bell train stops and then comes a non-active period during which the ring bell voltage is absent, the output of trigger 151 goes "high", thus producing the triggering of monostable 153'. The output of the latter goes from "low" to "high" and energizes the coil of relay 158', thus making the normally open contact 165 to close. Therefore, any code signal sent through the phone line, will pass from input terminal 1' to the input of filter 163. Since the latter is designed to allow the passage of code signals having frequencies clearly higher to the frequency of the ring bell signal, these code signals will go into the input of amplifier 22 of FIG. 2 and from this latter into the rest of the electronic control circuit.

Monostable 153' has a time constant set by resistor 160 and capacitor 162, that makes said monostable turn back to its stable state after a period of time corresponding to pre-set delay. The time constant circuit is adjusted in such a way that its duration turns out to be equivalent to the 90%, approximately, of the duration of a non-active ring bell period. Therefore, a short time before this later is finished, monostable 153' will turn back to its stable state, by means of which coil 158' is de-energized and contact 165 will open again so that the ring bell signal corresponding to the following active period is not applied to the input of filter 163. This sequence continues as long as ring bell signal arrives at input terminals 1' and 2', in such a way that ring bell signals will not be ever applied to the input of filter 163.

Even when it has been assumed, in the description of FIG. 3 layout performance, that no ring bell signal substantially arrives to the input of amplifier 22, owing to the fact that input filter 19 considerably attenuates said signal, this requires a filter with very rigurous features the cost of which turns out to be considerable. The use of FIG. 9 layout allows filter 163 to feature less rigurous specifications and therefore turn out to be less expensive, because this layout annules completely the possibility that ring bell signal arrives at amplifier 22 input (see FIG. 3). On considering this fact, not only the ring bell signal must be taken into consideration, but also a variety of spurious signals appearing through the phone line. The present low price of the components required for FIG. 9 layout makes its use turn out to be less expensive that a filter as required in FIG. 3 layout, because filter 163 may be non-expensive.

Figure 10:
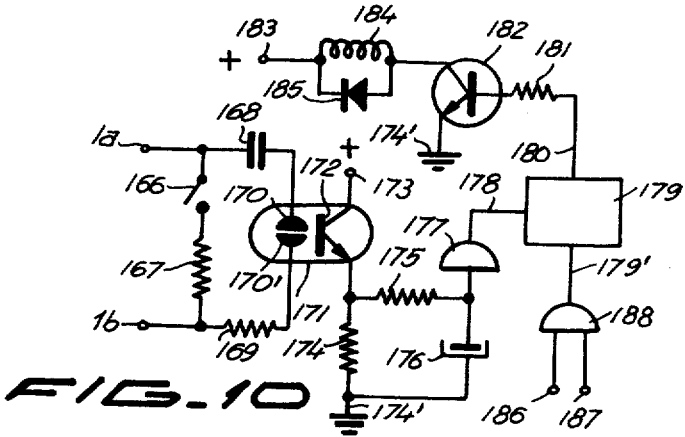
FIG. 10 shows the circuit diagram of one of the possible emdobiments of an automatic line release device.

As it has been mentioned before, referring to FIG. 3, an automatic line releasing device may be used in the layout of said figure in order to prevent the line from being kept indefinitely by the calling party, in case this one has sent a code. A possible way of realization for this automatic line releasing device is illustrated in FIG. 10. Input terminals 1a and 1b are intended to be connected to the phone line. An in series assembly constituted by a normally open relay 166 and a resistor 167 is connected between both input terminals. Input terminals 1a and 1b are coupled, the first one through a capacitor 168 and the second through a resistor 169, to electrodes 170 and 170' of a neon light contained into an optical-electronic coupler 171, that contains as well a phototransistor 172, the bussing electrode of which is connected, through terminal 173, to the positive of a power supply and the emitting electrode of which is connected to ground through a resistor 174. In addition, the emitting electrode of phototransistor 172 is coupled, through a filter constituted by a resistor 175 and an electrolytic capacitor 176, to the input of a Schmitt trigger 177, the output of which is coupled to the clock input 178 of a counter 179 (that, as usual, comprises a flip-flop chain). Output 180 of counter 179 is coupled, through a resistor 181, to the base electrode of transistor 182 the emitting electrode of which is connected to ground 174' and the bussing electrode of which is connected, through terminal 183, to the positive of a power supply through coil 184 of a relay that has a normally open contact 166 associated to it. A protective diode 185 is provided in parallel with coil 184. Terminal 186 corresponds to validation output that, in FIG. 3, is represented by output Q 34 of flip-flop 32, while terminal 187 corresponds to reset input 48 of the same flip-flop. To terminals 186 and 187 are respectively connected the inputs of an "AND" gate 188, the output of which is coupled to the reset input of counter 179. The automatic line releasing device works only after a pre-established number of ring bell signal wave trains has been received, that is to say, after a pre-established number of active periods. It has been verified in practice that nine active periods, for example, is a suitable number. The performance of FIG. 10 layout is as follows: After the calling party has dialed the phone number of the subscriber he wants to call, and after the ring bell circuit has been established by the central office, the ring bell signal wave trains will enter through terminals 1a and 1b. It must be noted that, since switch 166 is a normally open contact, resistor 167 will not affect the line. The first wave train being received is applied to electrodes 170 and 170' so as to produce the luminiscence of neon gas contained at optical-electronic coupler 171. This luminiscence will energize photoelectric transistor 172, the emitting electrode of which produces a pulsing signal that is equalized by the filter constituted by resistor 175 and electrolytic capacitor 176. The equalized output of this filter is applied to the input of Schmitt trigger 177. Coming back for a moment to FIG. 3, since the normally closed contact 15 applies the ring bell signal, through components 40, 41 and 43, to trigger 47 input, at the output of this later a trigger signal will appear that is applied to input 186 of FIG. 10 gate 188. Nevertheless, no pulse will still appear at the output of gate 188, since its second input 187 has not received yet the corresponding level. In the meantime, if the calling party has sent the code signals, that will have passed through components 24, 26, 28, 30 and 32 of FIG. 3, the validation signal will appear at output 34 of flip-flop 32. Since the terminal 187 of gate 188 second input is coupled to said output 34, gate 188 will provide, at its output, a level that, when being applied to enabling output 179' of counter 179, will enable said counter in order to begin the count. From that moment on, trigger 177 will apply a pulse to the clock input 178 of counter 179 for reception of each succesive wave train of ring bell signal. Counter 179 counts a pre-established number of these trains (for example, nine). Once the count has been completed, at the output 180 of counter there is a change of state that, through resistor 181, is applied to base electrode of transistor 182, that will begin to conduct. Therefore, coil 184 of the relay will be energized, thus closing contact 166. This connects on the line 1a–1b resistor 167, that will have a value equivalent to the resistor that the suscriber's phone set reflects on the line. Therefore, this is like taking hand set of suscriber's phone set 12 off the hook. In response to this, the phone central office will stop sending ring bell wave trains, in such a way that at trigger 47 output (see FIG. 5) a "low" will appear that will be applied to input 186 of gate 188, in such a way that this later will reset counter 179 that in its turn inactivates transistor 182 and coil 184 of the relay will get de-energized thus opening again contact 166, thus disconnecting resistor 167 from the phone line. Having been fulfiled in such a way the simulated action of first un-hooking the phone and next hanging it up, the communication between calling party phone set and that of the called subscriber will be interrupted in the majority of present phone systems. It will be understood that the device of FIG. 10 is extremely convenient, but not indispensable for use of apparatus corresponding to FIG. 3 layout, or any layout to be described further on, where the automatic releasing device could be used as well.

Figure 11:
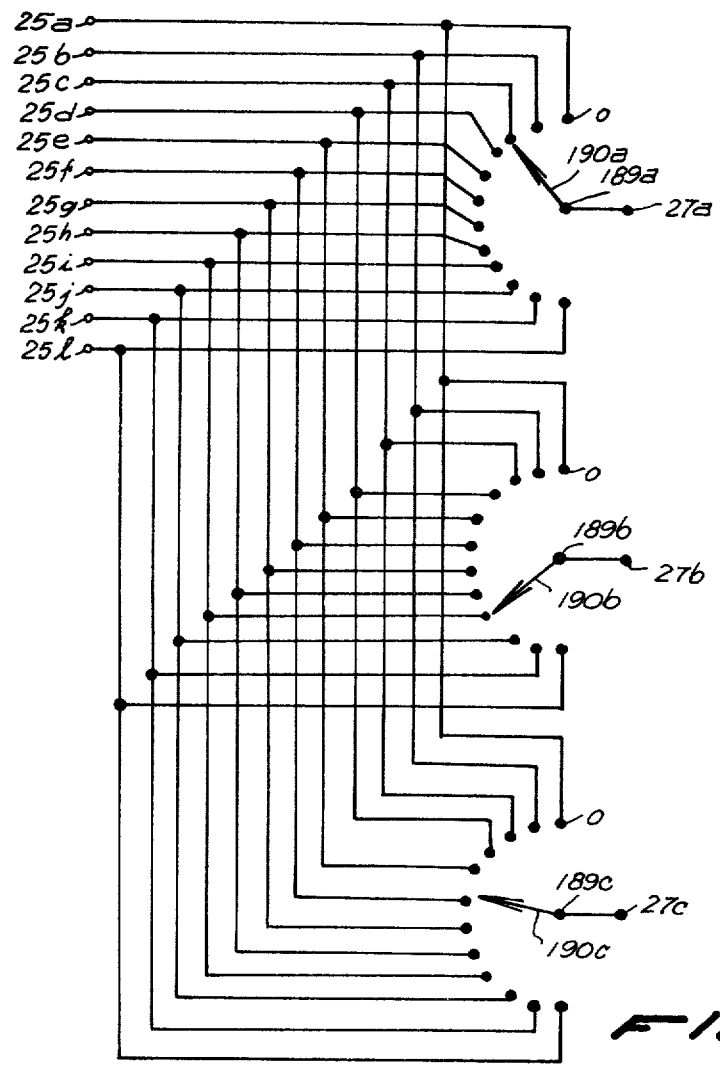
FIG. 11 shows a possible embodiment of the code selecting means usable in the embodiments of FIG. 3 and others.

A possible way of realization for code selecting means 26 (FIG. 3) has been illustrated in FIG. 11. As it can be seen, the essential elements of code selecting means are constituted by three switches 189a, 189b and 189c of one VIA and twelve positions each. The layout comprises twelve input terminals 25a to 25l corresponding to terminals indicated 25 in FIG. 3. The layout has as well three output terminals 27a, 27b and 27c corresponding to the three terminals indicated generically 27 in FIG. 3. As it can be seen, the first input terminal 25a is connected in parallel to contact 0 that corresponds to the first position of each one of keys 189a, 189b and 189c. In its turn, the second contact 25b is connected in parallel to each one of fixed contacts belonging to switches 189a, 189b and 189c corresponding to the second position of said switches. And so on for the rest of input contacts 25. The slides or mobile contacts 190a, 190b and 190c of selecting switches are connected, each one of them, to a corresponding output terminal 27a, 27b and 27c. Slides 190a to 190c have been illustrated in FIG. 11 in the positions corresponding, only as an example, to the three digit code 285. Therefore, if this code is received at output 25 of code selector, first digit 2 will be applied to input terminal 25c by the tone decoder and, as it can be easily seen in the schematic circuit shown in FIG. 11, it appears on terminal 27a, because only slide 190a is tied to fixed contact of the selecting switch corresponding to this digit. On being received and decoded the second code character, digit 8 will be applied to the input terminal 25i, appearing the signal corresponding to this digit just on the output terminal 27b which corresponds to the selecting switch having its slide in the position corresponding to the fixed contact connected to said output terminal 25i. Finally, on being received the third code character, tone decoding means will apply a pulse at input terminal 25f. This pulse will appear on output terminal 27c, since slide 190c of selecting switch 189c is the only one of the three slides tied to fixed switch contact connected to said input terminal 25f. It will be convenient to clarify here the case in which the code includes two or more repeated digits. Code "222" will be taken as an example. In this instance, the three slides 190a, 190b and 190c corresponding to the outputs of the three selecting switches 189a, 189b and 189c will be adjusted in such a way that they will be tied in the three instances with the third fixed contact (starting from the corresponding 0) of the repsective switches. In this particular case, or any other case in which there are digits repeated in the same code, when input terminal 25c receives the signal corresponding to digit "2" from the tone decoder, this signal will simultaneously appear on the three output terminals 27a, 27b and 27c. Nevertheless, sequence decoding means 28 (FIG. 3) will receive the corresponding signal only through its first input terminal (62 in the realization example illustrated in FIG. 6), since its other inputs are blocked. When the second digit "2" of code "222" is received immediately after, it will be received again on the same input terminal 25c and it will again appear simultaneously on the three output terminals 27a, 27b and 27c. In spite of this, sequence decoding means (always referring to realization example, illustrated in FIG. 6) will only have its input 63 enabled while the other two inputs 62 and 64 are blocked. Therefore, this second digit "2" will only affect to second input terminal of sequence decoding means. Finally, when the third digit "2" of code "222" is received on the tone decoder, it will be applied for the third time to input terminal 25c and in consequence it will simultaneously appear on the three output terminals 27a, 27b and 27c of code selector. In spite of this, since the sequence decoder of FIG. 6, after having received the second digit, has automatically blocked its two first inputs 62 and 63, only terminal 64 will be sensitive to digit "2" now received. It must be noted that, after having received the last code character (in the specific example illustrated in FIG. 6, the third digit), the sequence decoder validates the code and rests blocked. The skilled in the art will understand that code selecting means of FIG. 11 may be implemented in different ways, including a totally electronic layout and it will be evident too for the skilled in the art, that it is possible to adapt a layout such as that of FIG. 11, or other layouts as well, in order to suit codes composed by any number of digits, for example, one, two, three or more. In the case of a smaller number of digits, just one or two of the selecting switches will be suppressed, while in the case of a larger number of digits, it just requires the addition of switches following the same connecting rules as illustrated in FIG. 11. It is also easily understandable that in the case of apparatus designed for fixed codes, layout of FIG. 11 will be unnecessary and will be replaced by a group of bridges. For example, for code "285" there'll be three bridges, the first one of which will couple output 51c of tone decoding means (FIG. 4) to input 62 of sequence decoding means (FIG. 6), the second one will couple output terminal 51i to input 63 and the third one will couple output terminal 51f to input 64.

In the case of a fixed code having repeated characters, code "222" will be again taken as an example. In such a particular case, the three input terminals 62, 63 and 64 (FIG. 6) will be connected between them and besides the three of them will be connected to output terminal 51c (FIG. 4). It is considered that the two given examples will suffice skilled in the art so that they may deduce any other desired case, even if means 26 (FIG. 3) are of an electronic sort and intended for changeable codes. It will be possible as well to implement sequence selecting means illustrated in FIG. 6 for a code consisting of two characters, or more than three characters, being this completely understandable for the skilled in the art with no need of detailed explanations, since it is just a matter of suppressing a set of "AND" gate and flip-flop or instead of adding additional sets of "AND" gates and flip-flops, following the design rules that are perfectly illustrated and exemplified in reference to FIG. 6.

Figure 12:
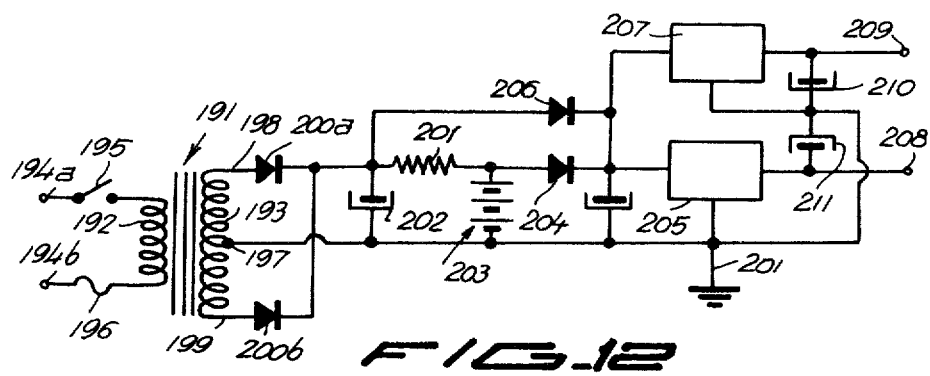
FIG. 12 shows a possible embodiment of a power supply device usable in any of the embodiments of the present invention.

In FIG. 12 is shown, as an example only, a possible way of realization of a power supply suitable to supply the necessary feeding potentials to the different elements constituting the layout of the present invention.

The skilled in the art will understand that the schematic circuit of FIG. 12 is given as an example only, since it can be considered that the power supply of this sort is a conventional one.

It comprises a voltage cut down transformer 191 having a primary coil 192 and a secondary coil 193. Through terminals 194a and 194b primary coil 192 may be connected to the home a.c. electric line (for example 110 V) through a general switch 195 and a fuse 196, as usual. The secondary coil 193, having a central derivation 197, has each one of its ends 198 and 199 connected to corresponding rectifying diodes 200a and 200b the cathodes of which are connected in parallel. Central derivation 197 is connected to ground 201. The cathodes of rectifying diodes 200a and 200b are connected to a resistor 201 and to an electrolytic capacitor 202. To resistor 204 output is connected a battery 203 with its anode connected to the output end of resistor 201 and its cathode connected to ground. To resistor 201 output is also connected a diode 204 the output of which is connected to the input of a voltage stabilizer 205. Another diode 206 has its anode connected to resistor 201 and capacitor 202, while its cathode is connected in parallel with the cathode of diode 204 and at the same time the cathodes of both diodes 205 and 206 are connected to the input of another voltage stabilizer 207. The output of stabilizer 205 is connected to the output terminal of power supply 208 while the output of stabilizer 207 is connected to the output terminal of power supply 209. Electrolytic capacitors 210 and 211 are respectively connected between each output terminal 208 and 209 and ground 201. Battery 203, that may be of NiCd type or similar, has the mission of feeding in case there is a power failure on input terminals 194a and 194b, because, if it wasn't so, the apparatus would be out of operation during power failure periods. Resistor 201 serves for keeping in slow charge battery 203.

Figure 13:
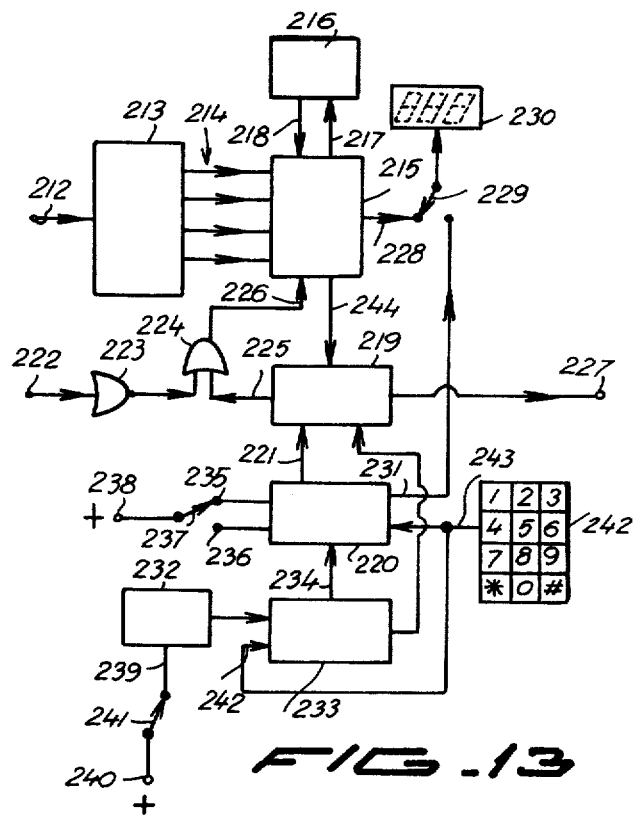
FIG. 13 shows, in block form, a combined embodiment of the code selecting means and sequence decoding means usable in several of the embodiments of the invention.

A realization variant of tone decoding means 24, code selecting means 26 and sequence decoding means 28 of FIG. 3 is illustrated in FIG. 13. This way realization has the aim of allowing the called suscriber to have an indication of the code sent by the calling party. In addition, it provides as well means allowing to select the code, that is to say, to change the code at his will, in a strictly electronic way, instead of using selecting switches illustrated in FIG. 11. The tone decoder, instead of converting the pairs of code frequencies into signals corresponding to decimal system, converts them into binary type signals. Input terminal 212 of FIG. 13 corresponds to output 23 of FIG. 3 layout. Therefore, signals having passed through filter 19 and amplifier 22 are applied to tone decoder 213, that has, for binary signals, the four outputs indicated generically 214. The characters code represented by pairs of frequencies, that has been sent by the calling party, goes into decoder 213, on the outputs 214 of which appear the signals converted into binary system and go into a code accumulator 215 that accumulates them. An interdigits chronyser 216 receives in succession the binary code signals gone into code accumulator and determines if the code characters sequence has been sent during a pre-established time. That is to say, if the second code character is received after a time longer than the pre-established time from the reception of the first character, it sends through 218 a reset signal to code accumulator in order to erase the first information having been received. If the third code character is received after a time longer than the time pre-established in respect to reception of second character, it will also send through 218 a signal in order to reset the code accumulator. And so on for the subsequently received characters of the code. The apparatus comprises a comparator 219 that receives from the code accumulator the received code characters and compares them with pre-established codes in a random access memory 220, that sends to comparator 219, through 221, said pre-established codes. Input terminal 222 is coupled to the output of Schmitt trigger 47 (FIG. 3). Therefore, input 222 receives a signal indicating if there is ring bell signal present. This signal is applied to an inverter 223 that in its turn applies its output to a NOR gate 224. The other input of gate 224 is coupled to a no validation output 225 of comparator 219, while the output of gate 224 is coupled to a reset input 226 of code accumulator 215. Comparator 219 has in its turn a validation output connected to terminal 227, that corresponds to input 29 of gate 30 in FIG. 3. The code accumulator has an output 228, that is coupled to one of the fixed contacts of an inverter switch, manually driven, 229, the mobile contact of which is associated to a conventional presentation device 230. The other fixed contact of switch 229 is connected to an output 231 of random access memory 220. This random access memory 220 is sequentially scanned by means of an oscillations generator layout 232, the output of which is applied to one of the inputs of a counter device 233 the output 234 of which to a sequential scanning input of random access memory 220. In addition, memory 220 has two reading and writing control inputs 235 and 236 being connected to fixed contacts of a manually driven inverter switch 237 the mobile contact of which is connected to a control potential terminal 238. The oscillations generator 232 receives through 239 a control signal from terminal 240 and a two-positions selecting switch 241.

FIG. 13 layout includes a keyboard 242 generating code characters, the output 243 of which is coupled to a code receiving input of random access memory 220, and at the same time output 243 of keyboard 242 is also coupled to a second input of counter device 233. FIG. 13 layout works as follows.

As long as, on terminal 222, there's no ring bell signal present indicating that a call is being received, the code accumulator 215 will be reset through inverter 223 and "0" gate 224. Assuming that a call is received now through phone line terminals 1 and 2 (see FIG. 3) the ring bell signal will be converted, at the output of Schmitt trigger 47, into a pulse that, when being applied to terminal 222 and inverted by inverter 223, activates "0" gate 224 that enables the code accumulator through 226. In consequence, the code signals being subsequently received during the non-active ring bell periods, will be applied by amplifier 22 (FIG. 3) to terminal 212 and will go into the tones to binary decoder 213. The first code character sent by the calling party will go, through 214, into code accumulator 214 and the interdigits chronyzer 216 will start to count time when being activated through 217. It must be here clarified that inverter switches 229, 237 and 241 are actually constituted by only one inverter switch of three ways and two positions, manually driven. The function of these switches will be seen later. For the moment, it suffices to clarify that the two positions in which said switches have been shown in FIG. 13, correspond just to the function that is hereby denominated "reading". The received code will be sent, through 228 and switch 229 section, to the display device 230 that will visually show the received code. At the same time, through 224, the codes accumulator sends to comparator 219 the accumulated code. Assuming that a number of codes are registered in random access memory 220, and being this memory sequentially scanned by the combination of oscillations generator 232 and counter 233, the random access memory will send through 221 and in succession, the codes it has registered. Comparator 219 compares the code received through 244 with the codes received through 221, and, if the received code corresponds to any of the codes registered in random access memory, it will send a code validating signal that, through terminal 227, is applied to resistor 35 and transistor 36 of FIG. 3, thus starting the operation sequence already described in reference to said FIG. 3.

If it is assumed, on the contrary, that the code received by comparator 219 through 244 does not correspond to any of the codes sent by the random access memory, it will not send a validating pulse on its output 237 and instead it will send a non-validating pulse through its output 225 that, through "0" gate 224, resets the codes accumulator 215 erasing the accumulated code.

What has been described up to now corresponds to that case when a number of pre-established codes were registered in random access memory 220. In case the suscriber wants to change one or more codes registered in the random access memory, he will change the position of triple selecting switch 229-237-241. This produces the following effects. In first place, the oscillations generator 232 will stop working due to the fact that switch 241 section has inactivated it. Therefore, in principle, counter 233 doesn't receive signals to count. When it is desired to introduce one or more new codes replacing some of those registered in the random access memory, said new codes are to be keyed on keyboard 242 and the circuits associated with it will send, through 243, the new codes introducing them into memory 220. At the same time, each output signal 243 makes counter 233 advance one step and said counter, through 234, makes the new codes occupy their corresponding place in memory 220. At the same time, the memory successively sends, through 231 and the section of inverter switch 229, the new codes to the display device 230 so that the user is able to check that the keyed codes are the right ones.

In respect to the rest of the apparatus, it works in the same way as described before in reference to FIG. 3 layout.

FIG. 14 shows another way of realization of the present invention. This way of realization differs from the way illustrated in FIG. 3 in the fact that it is designed to work in the following way. The calling party begins "dialing" the phone number corresponding to the suscriber he wants to call. As soon as the calling party perceives at his receiver the ring bell call sounds, he "dials" a preamble code (that may consist of only one character as well as of several characters) during one or more non-active ring bell call periods. These characters are received by FIG. 14 apparatus, are decoded, compares the decoded preamble code with one or more pre-established codes and, in case it coincides with one of said pre-established codes, validates the received code, then sending to the line a confirmation tone that will be received by the calling party and simultaneously the apparatus answers electrically the call (as if the called suscriber would have taken the receiver of his phone set off the hook) in response to the validation of the preamble code and, being already absent the ring bell call sounds owing to the fact that the call has been "answered", the calling party sends a second code that may consist of one or more characters. In the specific example that will be further described, this second code is assumed to consist of three characters. The apparatus of FIG. 14 compares again this second code with one or more pre-established codes and, if it finds a coincidence between the code sent by the calling party and one of the pre-established codes, it sends to the line a differentiated accoustic tone, by means of which the calling party will know that the apparatus has recognized and accepted the code he has just sent. If the called suscriber wants to do so, he answers the phone. Nevertheless, the called suscriber may not be willing to answer the phone, or perhaps he is absent thus not being able to answer. In this case, the apparatus of FIG. 14 waits for a pre-established time after which it will simulate electrically the condition corresponding to the hang up of the receiver by means of which the line will be released at the phone central office. In addition, the apparatus comprises a switch by means of which the suscriber can choose between the two following alternatives. If this switch remains closed the phone set will remain connected to the line, in such a way that on being received a call the phone ring bell will sound independently of a code sending. In spite of this, the apparatus will the same receive, decode and (if it corresponds) validate the received codes and will proceed in the same way as explained before. On the contrary, if the suscriber leaves the switch open, the ring bell of his phone set will not sound in response to a call and only the device of FIG. 14 will emit accoustically a differentiated tone in order to warn him that a call has been established, that the corresponding codes have been received, and that they have been validated.

In the first case, the performance is considered to be "semiprivate" while in the second case it is considered to be "private".

FIG. 14 apparatus comprises input terminals 1 and 2 that will be connected to the suscriber's phone line. Terminal 1 is connected, through a switch 245, to one of the ends of the coil energizing a relay 246 in parallel with which a capacitor 247 is connected. The other end of energizing coil 264 is connected to one of the ends of suscriber's phone set 248, while the other end of phone set 248 is connected to the other terminal 2 of phone line that is in its turn connected to ground. In addition, input terminal 1 is connected, through a normally closed relay contact 249 and through other normally open relay contact 250 and through a resistor 251 to input terminal 2. Contact 249 is also connected, through a capacitor 252 and a resistor 253, to the input of a highpass filter 254 having a function similar to that of FIG. 3 filtering means 19. A protective diodes assembly 256a and 256b is connected between filter 254 input and ground 255. Filter 254 output is connected, through a capacitor 257 and a resistor 258, to a first input of an operational amplifier 258. The other input of amplifier 258 is connected to ground 255 through a resistor 259 in parallel with which a capacitor 260 is connected. At the same time, said second input of amplifier 258 is connected, through a resistor 261, to the positive terminal 262 of the apparatus power supply. Between amplifier 258 output and its first input a resistor 262 is connected, and in parallel with this later an assembly constituted by a resistor 263 and a normally open relay contact 264 is connected. Amplifier 258 output is coupled, through a capacitor 265, to the input of a tone decoder 266 that may be similar, for example, to the one illustrated in FIG. 4. Since the way of realization illustrated in FIG. 14 is intended for being used in phone systems where the "dialing" is performed by means of tones each one of which is made up of a pair of frequencies, tone decoder 266 will have twelve outputs generically indicated 267 in FIG. 14. Each one of these outputs 267 is coupled to a corresponding input of code selecting means 268 that may be, for example, similar to those illustrated in FIG. 11. Always referring to the example of a three characters code, code selecting means 268 will have three outputs 269a, 269b and 269c. Each one of these outputs 269 is coupled to a first input of a corresponding "AND" gate 270a, 270b and 270c, respectively. The output of each one of these gates 270 will be coupled to a corresponding input 271a, 271b and 271c of sequence decoding means 271 that may be similar, though no identical, to those illustrated in FIG. 6. Output 272 of sequence decoding means 271 is coupled to the clock input of a flip-flop 273. The output of flip-flops 273 is coupled to a first input 274 of an "AND" gate 275. The second inputs of gates 270, an enabling input 277 of flip-flop 273 and a second input 274b of gate 275 are connected between them and, besides, through a resistor 278 they are coupled to the base electrode of a transistor 279, the emiting electrode of which is connected to ground 255, while its bussing electrode is connected to one of the ends of a coil energizing relay 280 the other end of which is connected to positive terminal 281 of the apparatus power supply. A protective diode 282 is connected in parallel with coil 280. The output of gate 275 is connected to one of the ends of a differentiated accoustic tone generator 283 the other end of which is connected to ground 255. On the other hand, terminal 1 of phone line is connected to the output of a tone generator oscillator 286 through the normally closed relay contact 249, capacitor 252, resistor 253, resistor 284 and capacitor 285. Oscillator 286 is fed from the output of gate 275 through a diode 287. Resistors 288 and 288' and capacitor 289 are the elements determining the frequency generated by the oscillator 286. The bussing electrode of transistor 279 is coupled, through a capacitor 290, to the trigger input of a monostable 291. The output of this monostable is also coupled, through a diode 292, to the circuit feeding oscillator 286. Resistor 292 and capacitor 293 determines the time constant of monostable 291, being this later fed from terminal 281 connected to the positive of apparatus power supply.

The third input 274c of gate 275 is connected to the output of an oscillator 294 that will generate very low frequency oscillations, for example, of about 1 Hz. The frequency of oscillator 294 is determined by resistors 295 and 295' and capacitor 296, being oscillator 294 fed from terminal 281 connected to the positive of apparatus power supply.

The apparatus also comprises a chronizer 297 having an input coupled to one of the outputs 267 of tone decoding means 266. The case in which chronizer 297 input is coupled to the first output terminal 267 has been illustrated in FIG. 14. Nevertheless, it may be coupled to any of the other outputs according to the character chosen for the preamble code. The skilled in the art will easily understand that the input of chronizer 299 may be coupled at choice to any of the outputs 267 performing this couplement through a twelve positions selecting key, the slide of which will be connected to the chronizer input and each one of its fixed contacts will be connected to a corresponding one of outputs 267. Layouts for a preamble code consisting of only one character, fixed, as illustrated in FIG. 14, or changeable by means of a selecting key as illustrated above, have been mentioned before. As it will be seen later, the layout may be as well adapted for a preamble code, fixed or changeable, consisting of two or more characters. The chronizer is fed from terminal 281, connected to the positive of apparatus power supply. The time constant setting the chronizer 297 acting time is determined by a resistor 298 and capacitor 299. The trigger input of chronizer 297 is also coupled to the base electrode of a transistor 300, the bussing electrode of which is connected to ground 255 and the emitting electrode of which is connected to the control input of chronizer 297 to which the junction point between transistor 298 and capacitor 299 is also connected. Chronizer 297 output is connected, through a capacitor 301, to the trigger input of a monostable 302, the output of which is simultaneously connected to the second inputs of gates 270, to enabling input 277 of flip-flop 273, to second input 274b of gate 275 and to the base electrode of transistor 279, in this last case through resistor 278. Resistor 303 and capacitor 304 set the time constant of monostable 302. This is so when the normally open relay contact 305 is in open condition. Instead, when this contact 305 closes, it connects a resistor 306 in parallel with resistor 303, in such a way that the time constant will be determined by the combination of values of both resistors and of capacitor 304.

The performance of the way of realization illustrated in FIG. 14 is as follows. The calling party "dials" in the usual way the phone number of the suscriber he wants to call. When the exchange establishes the ring bell call circuit, this signal will be received on terminals 1 and 2 of the suscriber's phone set. Once the calling party perceives on his receiver the signals indicating him that the central is calling, he "dials" at least one preamble code character during one or more non-active ring bell call periods. Nevertheless, it must be clarified that this way of realization is designed so that the calling party sends the preamble code character (or characters) during a long time and preferably during the whole non-active ring bell call period. If the chosen preamble code comprises only one character, for example digit 4, he will press the key corresponding to 4 during all the length of the non-active ring bell call period. For example, if the preamble code comprises only one character, in the present case, digit 4, he may send the character during any of the non-active periods. Let's assume that he sends this character during the second non-active period. If the preamble code comprises two characters, for example 4 and 7, he may send the second character during, for example, the third or fourth or any other non-active ring bell call period. The same is applicable to any additional character comprised by the preamble code. Nevertheless, in the particular and special case of FIG. 14, the layout, just as it is illustrated, is only suitable for a preamble code consisting of only one character. The code so received goes into filter 254 that, like in the other ways of realization, will allow the passage of only the frequencies corresponding to the code characters, blocking instead the ring bell signal during the active ring bell call periods. Therefore, the signal corresponding to preamble code goes into the operational amplifier 258 that amplificates and applies said signal to tone decoding means 266. Always assuming that the chosen preamble code comprises only one character, a signal will appear on each one of outputs 267 according to the particular preamble code character. If the sent character corresponds to the code number for which the apparatus is foreseen, it will be applied on the input of chronizer 297. If the calling party keeps sending the preamble code character during the required time, as has been mentioned before, on the output of chronizer 297 will appear a signal triggering monostable 302 that has a time constant that may be of about 30 seconds. Monostable 302 output is applied to the second inputs of gates 270a, 270b and 270c, allowing the transference of information from the code selecting means to the sequence decoding means 271. At the same time, monostable 302 energizes transistor 279 through resistor 278 and the transistor triggers monostable 291. This activates in its turn oscillator 286 that, through capacitor 285, resistor 284, resistor 253, capacitor 252 and normally closed contact 249, will send to the calling party, through the phone line, a tone confirmating that the preamble code has been validated. At the same time, the energizing of transistor 279 energizes the relay coil 280 and the relay will close its normally open contact 250 in order to connect resistor 251 in parallel with the phone line. Since this resistor 251 has a value equivalent to the resistance of the phone set 248, the connection in parallel of resistor to terminals 1 and 2 will be equivalent electrically to the act of taking the receiver of phone set 248 off the hook, in other words the answering of the call is simulated. Relay 280 also activates the normally open contact 264 that closes connecting resistor 263 in parallel with resistor 262 between the input and the output of operational amplifier 258, reducing the amplifier gain in an important factor.

When the calling party perceives on his receiver the indications that the preamble code has been validated and the apparatus has "answered" (simulated electrical answer), he sends next a second code, that will be assumed here to consist of three characters that, on being successively received on terminals 1 and 2, will pass through filter 254 and amplifier 258 in order to be applied to the input of tone decoding means 266, that will successively decode these signals, getting the corresponding outputs 267 energized, according to the characters composing the code. The signals appearing on outputs 267 are applied to the corresponding inputs of code selecting means 268 that, in case there is a coincidence between the sent characters and those selected by selecting means 268, will send through its outputs 269a, 269b and 269c the corresponding signals to the first inputs of gates 270a, 270b and 270c. It must be remembered, according to what has been mentioned before, that these gates 270 are activated by signals received from monostable 302 and applied to the second inputs of the three gates 270. The sequence decoding means 271 verify the input order of the three characters and the time gone from the reception of each character to the following. In the event that the sequence as well as the time correspond to the pre-established code, the sequence selecting means will send at its output 272 a signal that is applied to the clock input of flip-flop 273. Since this later has been enabled at its input 277, it will change its state in response to the energizing of its clock input and will send at its output Q a signal that will go into the corresponding input 274a of "AND" gate 275. As it is already known, the second input of gate 275 is already activated by monostable 302. The third input 274c of gate 275 is also permanently activated by the signal present at the output of oscyllator 294 that has a very low frequency, for example 1 Hz. Therefore, the output of gate 271 is activated with a 1 Hz rythm. This signal generates a rectangular pulse with a frequency of 1 Hz at the output of gate 275 that will activate with the same rythm the accoustic indicating means 283, that may be constituted for example, by a piezoelectric transductor, and the same signal corresponding to gate 275 output will feed oscyllator 286 that, through the phone line, will send to the calling party a simulated call tone.

If the caller wants to answer the call, he shall close switch 245 and shall unhook the receiver of his phone set 248, by means of which coil 246 of the corresponding relay will be energized; the normally closed contact 249 of said relay will open disconnecting the apparatus from the phone line and the normally open contact 305 will close producing the fast charge of capacitor 304 that sets the time constant of capacitor 302. This will make that the output of this monostable goes to a low, producing the inactivation of transistor 279 and electroaccoustic transductor 283, as well as relay 280 that will open contact 250 and contact 264, thus resseting the control electronic apparatus and leaving the whole circuit resetted to its initial conditions. Once the communication is over, when the called suscriber hangs up the receiver 248, the de-energizing of coil 264 will produce the closing of contact 249, thus leaving the apparatus ready to receive a new call.

In the event that the called suscriber decided not to answer the phone or wasn't able to do so because of being absent, on finishing the before mentioned period of about 30 seconds, which is monostable 302 time constant, this later will change its state thus also reseting the circuit and leaving it ready for a new call.

In FIG. 15 is shown a variant of the FIG. 14 way of realization that, in many senses is similar to the former. Nevertheless, in FIG. 15 way of realization, the apparatus is adapted in order to electronically modify the codes desired to be pre-established and besides the apparatus provides, to the called suscriber, a visual display of the received code. In a certain sense, FIG. 15 way of realization is similar to that of FIG. 14, but having been replaced code selecting means and sequence decoding means 268 and 271 of FIG. 14 with a layout similar to that illustrated in FIG. 13. The differences specifically lie in the fact that, in the couplement between tone decoding means 213 and code accumulating means 215 of FIG. 13, gates 307a to 307d have been inserted, thus allowing to control the transference of binary characters, present at the output of tone decoding means 266, to sequence decoding means 271, by means of monostable 302. Random access memory corresponding to memory, indicated 220 in FIG. 13, is shown in FIG. 308. The keyboard serving to introduce new codes in memory 220 is indicated 309, in this case, comparator 215 has an additional output serving to energize electroaccoustic transductor 283, and one output energizing/visual code displaying means 310. At last, the validation output indicated 227 in FIG. 13 is connected in this case to the input of monostable 291 for the sake of its activation in response to the validation of the received code.

In general, further explanations on FIG. 15 way of realization are considered to be unnecessary, based on what has been already described in reference to FIGS. 13 and 14. On these bases, the skilled in the art will be able to understand properly the performance of FIG. 15 way of realization.

In order to make this easier, FIG. 15 elements performing similar functions to the corresponding elements of FIG. 14 way of realization, have been indicated with the same numerical references.

Figure 16:
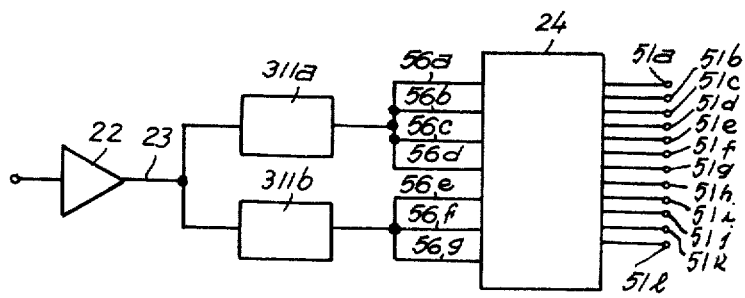
FIG. 16 shows a first possible embodiment of filtering means; connectable between the amplifying means and the tone decoding means in various embodiments of this invention.

FIG. 16 shows a layout of amplifying means 22 (see FIG. 3) and tone decoding means 24 including two filtering means and being suitable for the case of phone lines having a high noise level. Output 23 of amplifying means 22 is simultaneously coupled in parallel to the inputs of respective filtering means 311a and 311b. Assuming that tone decoding menas 24 comprise a layout such as illustrated in more detail in FIG. 4, the output of filter 311a is simultaneously coupled in parallel to the corresponding inputs 56a to 56d of tone decoders 52a to 52d. In its turn, the output of filtering means 311b is simultaneously coupled in parallel to inputs 56e to 56g of tone decoders 52e to 56g. Outputs 51a to 51l correspond to the outputs similarly numbered in FIG. 4. Filtering means 311a and 311b are pass-band filters.

Pass-band filter 311a has a band-pass of 650 to 1000 Hz, and band-pass filter 311b has a band-pass of 1100 to 1500 Hz. Therefore, the skilled in the art will be able to easily understand that filtering means 311a are intended to allow the passage of only the low frequencies of tone pairs sent as a code by the calling party, in other words, frequencies 697, 770, 852 and 941 Hz of "Touch-Tone" "dialing" system, while filtering means 311b have a band-pass allowing the passage of only the high frequencies composing each pair of frequencies in said "dialing" system, that is to say, 1209, 1336 and 1477 Hz.

Figure 17:
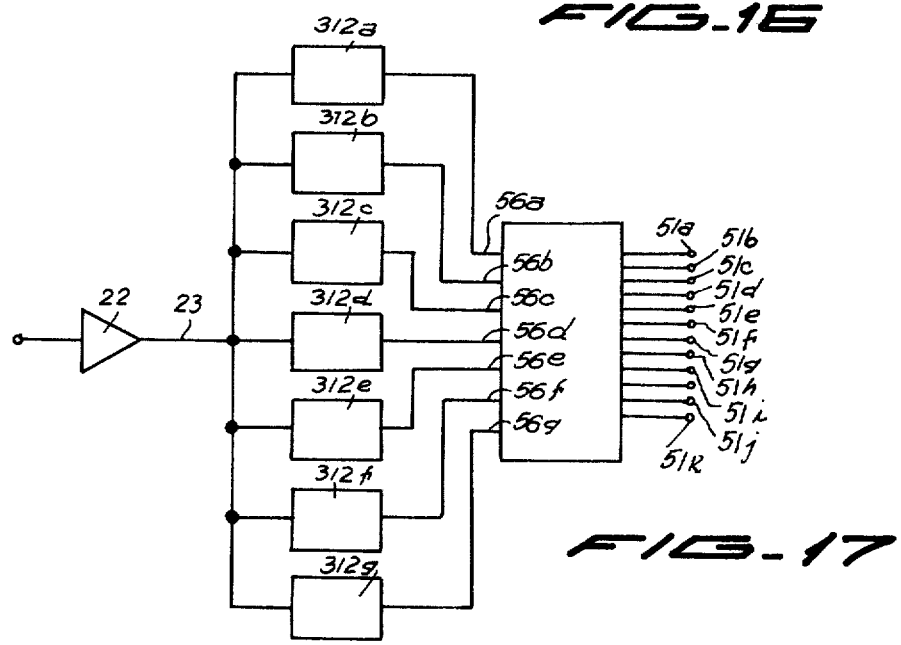
FIG. 17 shows a more elaborated alternative of the filtering means of FIG. 16.

Another way of realization intended for similar uses to those of FIG. 16 layout, but for conditions of extremely noisy phone lines, is shown in FIG. 17. This layout is similar to that shown in FIG. 16 but, instead of employing two filtering means, one for low frequencies and one for high frequencies, employs individual filtering means for each one of the frequencies used in the "Touch-Tone" "dialing" system. All the inputs of filtering means 312a to 312g are connected in parallel between them and besides to output 23 of amplifying means 22 (FIG. 3).

The outputs of filtering means 312a to 312g are respectively connected, each one of them, to a corresponding input 56a to 56g of tone decoders 52a to 52g (FIG. 4). Filtering means 312a to 312g are therefore designed to allow the passage of frequencies 697, 770, 852, 941, 1209, 1336 and 1447 Hz, respectively. Even when it has been mentioned before that tone decoding means may correspond to layout illustrated in FIG. 4, the skilled in the art will easily understand that said means may be replaced with any other equivalent tone decoding layout.

Figure 18:
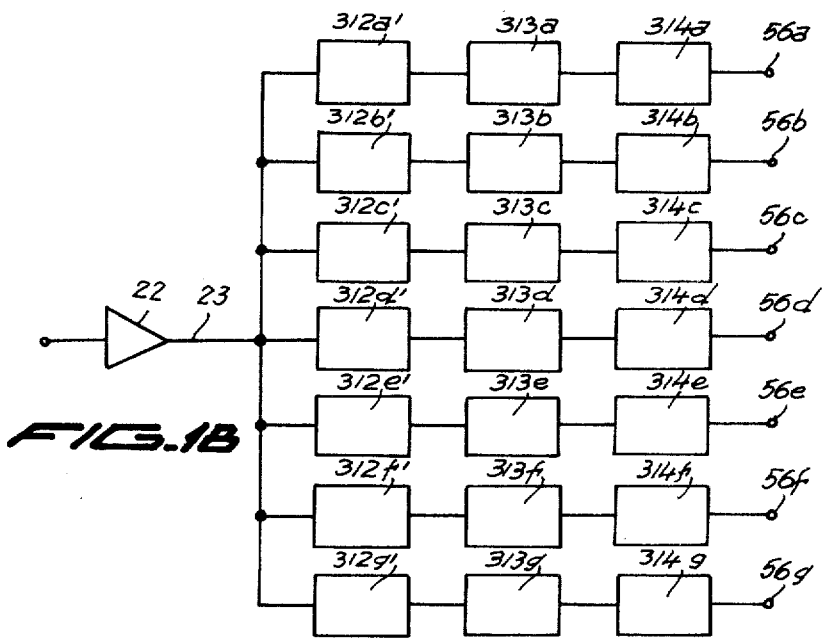
FIG. 18 shows a possible embodiment of each of the tone decoders of the arrangement shown in FIG. 4.

FIG. 18 shows an arrangement similar, but more elaborated, to that of FIG. 17. It comprises two seven band-pass filters 312a' to 312g' designed for frequencies 697, 770, 852, 941, 1209, 1336 and 1477 Hz, respectively. The inputs of all these filters are connected in parallel between them and to the output 23 of the amplifier 22. Each filter has its output connected to a corresponding rectifier 313a to 313g that convert the corresponding alternating current signals of the outputs of filters 312a to 312g to respective continuous current signals being applied, each one of them, to a corresponding trigger 314a to 314g. The seven outputs of these triggers are equivalent to corresponding outputs 61a to 61g of tone decoders 52a to 52g of FIG. 4, or other equivalent means. In other words, each chain constituted by a band filter 312, a rectifier 313 and a trigger 314, performs the function of one of the tone decoders 52a to 52g.

Figure 19:
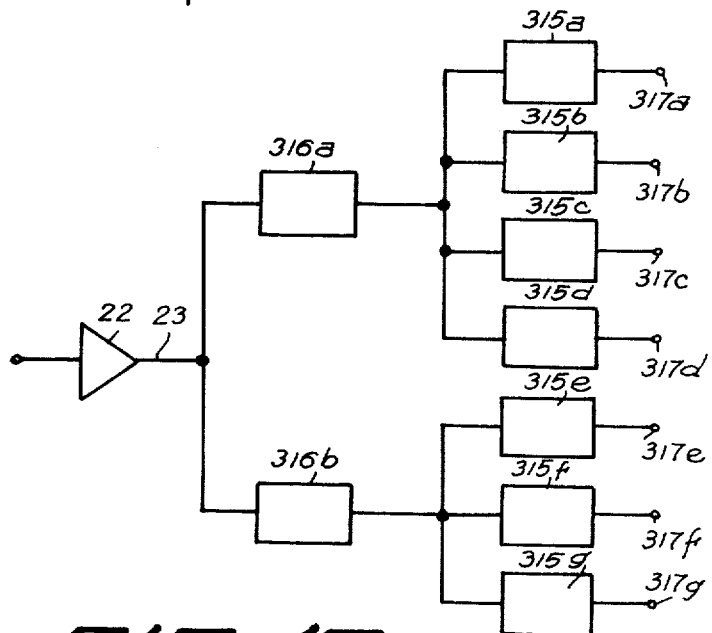
FIG. 19 shows another possible embodiment of the tone decoders used in FIG. 4, but based on the use of reed resonating filter means.

In FIG. 19 another embodiment is shown which may be used in substitution of the code decoders of the arrangement illustrated in FIG. 4. Each tone decoder comprises a reed resonant filter which in a certain way, is similar to a reed frequency meter or vibrating-reed frequency meter. Each reed resonant filter 315a to 315g is designed to resonate at one of the specific frequencies of the "Touch-Tone" "dialing" system. That is to say, to resonate at frequencies of 697, 770, 852, 941, 1209, 1336 and 1477 Hz. The inputs of the tone decoders 315a to 315d are connected in parallel and also to the output of a first band-pass filter 316a the pass-band of which extends from 650 to 1000 Hz. In a similar way the inputs of the tone decoders 315e to 315g are connected in parallel and also to the output of a second band-pass filter 316b, the pass-band of which extends between 1100 to 1500 Hz. The inputs of the band-pass filters 316a and 316b are connected together and also to the output 23 of the amplifying means 22 (see FIG. 3). Each of the outputs 317a to 317g of the tone decoders 315a to 315g corresponds to a respective output 67a to 67g of the arrangement shown in FIG. 4.

Figure 20:
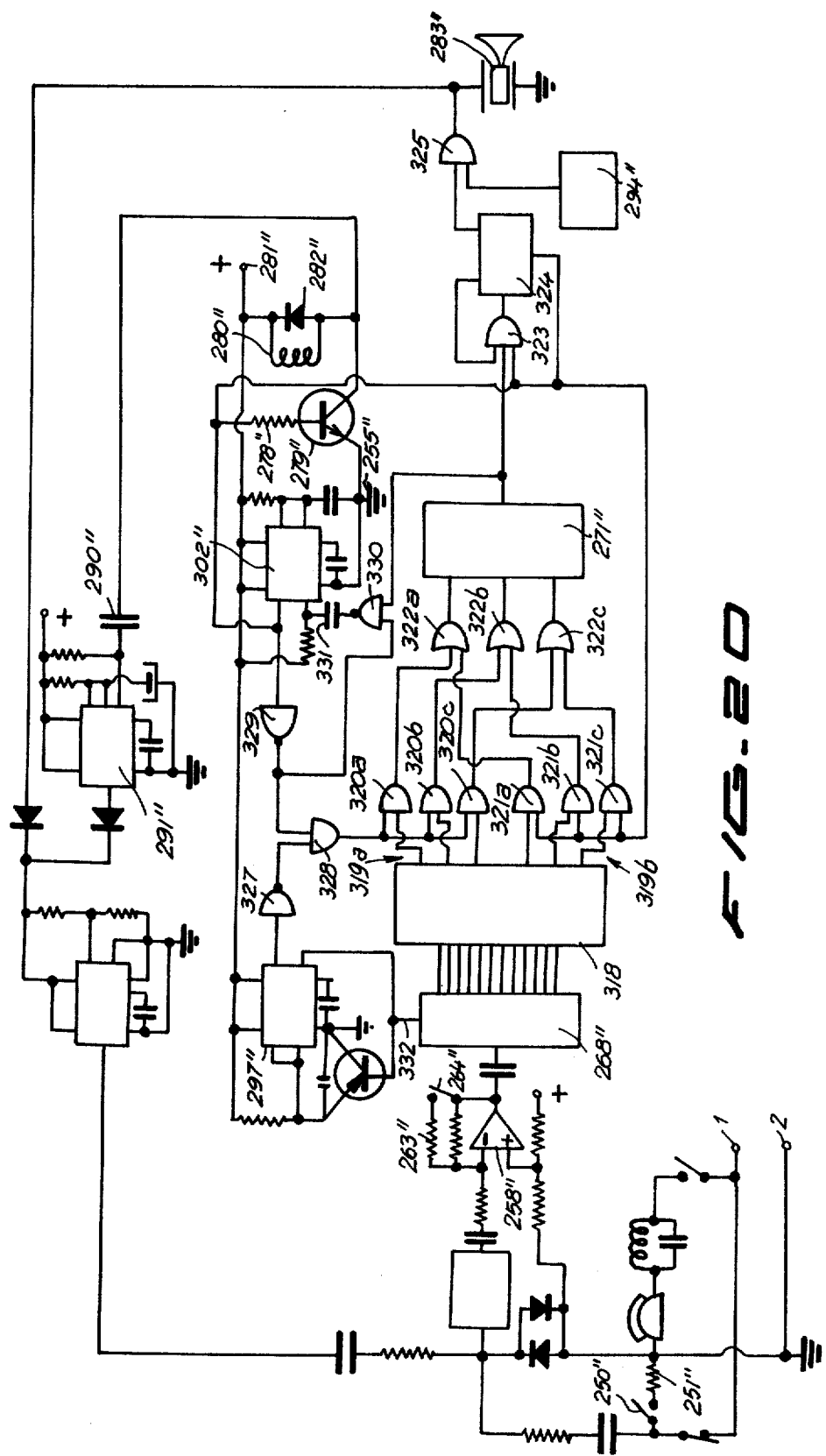
FIG. 20 shows an embodiment of the present invention which is suitable for the use with embodiments intended to be used with a preamble code comprising several characters.

In FIG. 20 an embodiment of the present invention is shown which is suitable for the case in which a preamble code, comprising at least two characters, must be sent by the calling party.

FIG. 20 illustrates a way of realization designed for the use, in addition to the main code, of a preamble code that may comprise one or more characters. The specific way of realization illustrated in FIG. 20 is suitable for the use of three characters in the preamble code. Some portions of FIG. 20 arrangement are similar to those equivalent of FIG. 14, and therefore, have been indicated in FIG. 20 with the same numerical references but with the addition of "symbol". As it can be seen in FIG. 20, code selecting means 318 comprise two groups of three outputs each one generically indicated 319a and 319b. Three "AND" gates 320a, 320b and 320c have one of their inputs connected to a corresponding one of outputs 319a, while a second group of "AND" gates 321a, 321b and 321c have one of their inputs connected to a corresponding one of outputs 319b of code selecting means 318. Three "O" gates 322a, 322b and 322c have one of their inputs coupled to the output of a corresponding one of gates 320a, 320b and 320c, respectively. The other inputs of gates 322a to 322c are connected to the output of a corresponding one of gates 321a to 321c. The outputs of gates 322a to 322c are coupled to corresponding inputs of sequence decoding means 217". The output of these later is connected to one of the inputs of an "AND" gate 323, the output of which is connected to the clock input of a flip-flop 324, the output Q of which is coupled to one of the inputs of another "AND" gate 325. Output $\overline{Q}$ of flip-flop 324 is coupled to a second input of gate 323. A low frequency oscyllator (for example 1 Hz) 326 has its output coupled to a second input of gate 325. An electroaccoustic transductor 283 is connected to the output of this gate. The other inputs of gates 321a to 321c are connected between them and coupled to a third input of gate 323 and to the enabling input of flip-flop 324. To the output of chronizer 297 there is coupled the input of inverter 327, the output of which is coupled to one of the inputs of an "AND" gate 328. The other inputs of said gates 320a to 320c are connected between them and coupled to the output of said gate 328. To the output of monostable 302" there is coupled the input of an inverter 329 the output of which is coupled on one side to the other input of gate 328 and on the other side to one of the inputs of an "AND" gate 330 the other input of which is coupled to the validation output of sequence decoding means 271". The output of gate 330 is coupled, through a capacitor 331 to a trigger input of monostable 302". The output of this later is also coupled, through resistor 278", to the base electrode of a transistor 279" having its emiting electrode connected to ground 255" while its bussing electrode is coupled, through a capacitor 290", to the trigger input of monostable 291". At the same time, said bussing electrode is connected to terminal 281" that corresponds to the positive of the apparatus power supply, through the relay energizing coil 280" and in parallel with which there is connected a protective diode 282". The rest of the circuit is similar to that of FIG. 14.

When the calling party has "dialed" the phone number of the subscriber he wants to call, and once the ring bell loop is closed, he has "dialed" the preamble code (that will be assumed to consist of three characters to the end of this example), this code will be received by FIG. 20 apparatus through terminals 1 and 2. Its characters will be applied to amplifier 258" and from this, already amplified, they go into tone decoding means 268". This later decodifies them and an H state appears on one of the twelve corresponding outputs of said means per each one of the three characters gone into. At the same time, appears an H state per each one of the characters gone into, on output 332 of tone decoding means 268" which is applied to chronizer 297" the output of which is coupled to inverter 327 and the output of this is coupled to one of the inputs of gate 328. Since an H state is applied is also applied to the other input of this gate 328, an H state will appear at the output of said gate 328 unblocking gates 320a to 320c thus allowing information of code double selector 318 to pass to sequence decoder 271" through gates 322a to 322c. If the received code characters are the right characters, have arrived in the due order and within the pre-established time, the decoder will validate the code and on its output an H state will appear that will be applied to gate 330 at the output of which will appear an L state triggering monostable 302 (having a time constant of 30 minutes). The output of said monostable is applied to inverter 329 that will apply a L state to the input of a gate 328, blocking it and therefore blocking also gates 320a to 320c. At the same time, the output of monostable 302" will energize transistor 279" through resistor 278" that, from its bussing electrode, will send the signal confirmating that the preamble code has been received by means of monostable 291". At the same time, coil 280" of a corresponding relay is energized from said bussing electrode. Therefore, FIG. 20 apparatus attends the call in an electrically simulated way, similar to that of FIG. 14 (what is produced by the closing of relay contact 250" and the connection of resistor 251" in parallel with the line, reducing at the same time the gain of the amplifier by the closing of relay contact 264" that connects resistor 263". In addition, through the output of monostable 302", gate 323 and gates 321a to 321c are unblocked. If the calling party, once the loop is closed, sends a second code, this will pass through a double programmer 318, gates 321a to 321c, and will be validated by sequence decoder 271". The output pulse of this later makes flip-flop 324 change its state through gate (now unblocked) 323, that through its output $\overline{Q}$, blocks again gate 323 and, through its output Q applies an H to gate 325. This later receives, on its other input the signal of low frequency (for example 1 Hz) oscyllator 294". Therefore, at the output of gate 325 will appear an alternate signal having a frequency of 1 Hz (according to the example mentioned) that energizes electroaccoustic means 283" while at the same time sends to the phone line an artificial ring bell signal that will be perceived by the calling party allowing him to know that the sent codes have been validated. The performance of the rest of the circuit is identical to what has been already described for FIG. 14.

Figure 21:
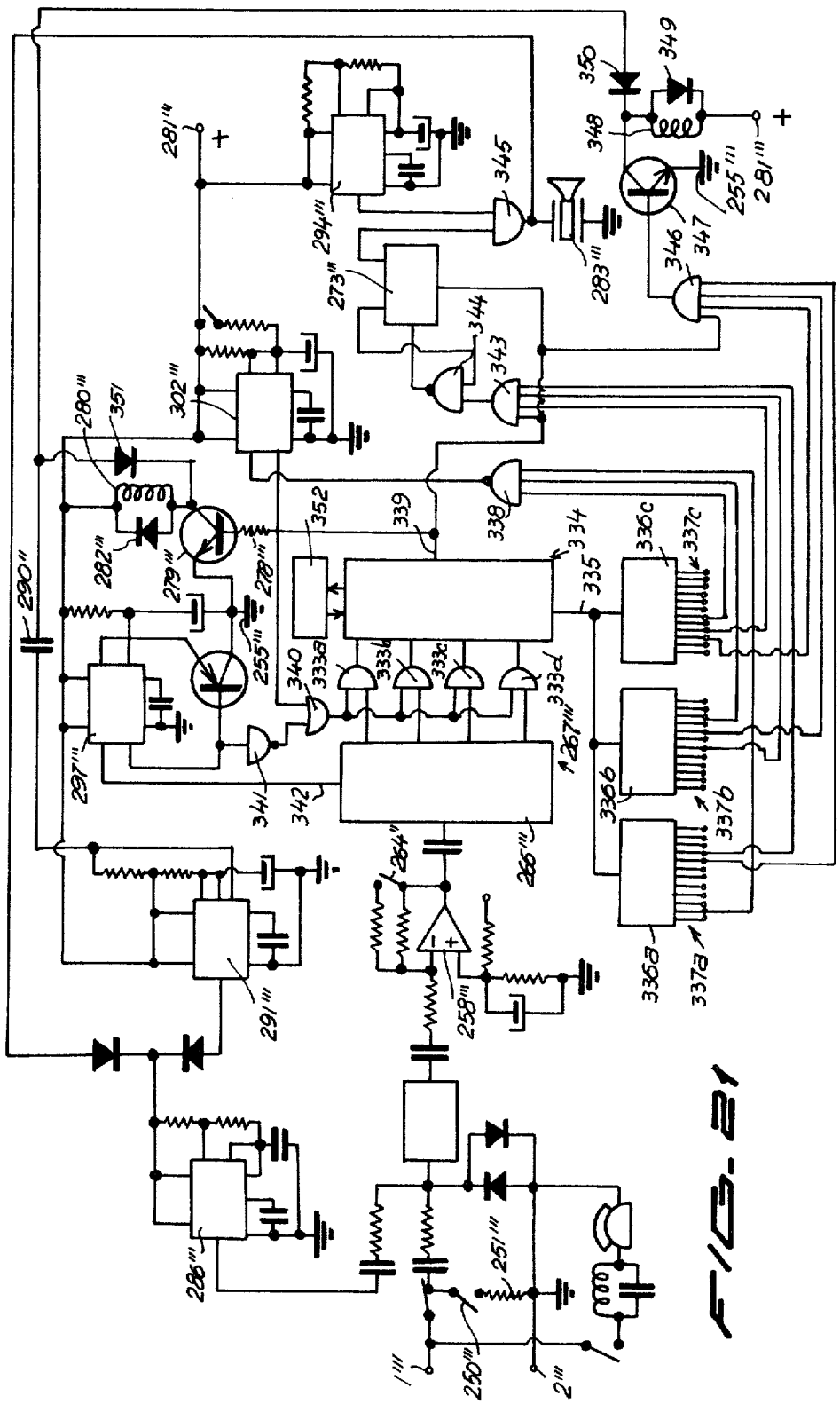
FIG. 21 shows an embodiment of the present invention which is useful in case that the apparatus of the present invention will be used to actuate one or more servo-controlled mechanisms in response to a phone call instructing the accomplishment of such operation.

FIG. 21 shows a way of realization of the apparatus of the present invention that is suitable for sending, during the inactive ring bell periods, a preamble code and, once the loop is closed, a second code providing to the called subscriber an indication that the calling party is a desired one, or a second code allowing to initiate a desired electrically controlable operation, in this last instance being no need that the called subscriber answers unhooking the receiver of his phone set. This FIG. 21 arrangement allows to perform, through a simple phone call, an operation such as driving an air conditioner, a heating system, a machine in a factory, an oven or any other operation electrically controlable.

Certain portions of the circuit of FIG. 1 arrangement are similar to those of FIG. 14, having been indicated with the same numerical/references but with the addition of symbbol'".

As it can be seen in FIG. 21, a binary system tone decoder is employed, for the sake of which the tone decoder 266'" has four outputs generically indicated 267'", each one of them being applied to a first input of four gates 333a, 333b, 333c and 333d. The outputs of these gates 333a to 333d are each one of them connected to a corresponding input of code selecting and sequence decoding means 334 that may be, optionally, an adaptation, at the reach of anybody skilled in the art, of arrangement illustrated in FIG. 13. An output 335 of means 334 is simultaneously connected in parallel to the corresponding inputs of three decoding means DCB (in binary codified decimal) 336a, 336b and 336c, having each one of them twelve outputs generically indicated 337a, 337b and 337c. The arrangement comprises an NO-AND gate 338 having three inputs, each one connected to a corresponding one of the outputs of each decoder 336a to 336c, selecting the outputs 337a to 337c of said decoders according to the pre-established code. The output of this gate 338 is applied to the trigger input of monostable 302'". The validation output 339 of selector and decoder 334 is coupled to the output of monostable 302'" and at the same time energizes transistor 279'" through resistor 278'" the emiting electrode of which is connected to ground 255'" and its bussing electrode to energizing relay coil 280'", being connected in parallel with said coil a protective diode 282 and being the other end of the coil connected to terminal 281'" that corresponds to the positive of the apparatus power supply. On the other hand, the output of monostable 302'" is also coupled to one of the inputs of an "O" gate 340 the output of which is simultaneously connected in parallel to the other inputs of gates 333a to 333d. The other input of gate 340 is connected to the output of an inverter 341 the input of which is connected to the output of chronizer 297'". The trigger input of this chronizer is connected to an output 342 of tone decoding means 266'" which is activated in response to each code character going into the tone decoding means 266'". Another "AND" gate 343 has four inputs, one of them being coupled to the validation output of selecting and decoding means 334 while its other three inputs are coupled to corresponding outputs 337a to 337c of decoding means 336a to 336c according to the second established code (identification of the calling party). The output of this gate 343 is coupled to one of the inputs of an "AND" gate 344 the output of which is coupled to the clock input of flip-flop 273'". Output $\overline{Q}$ of this flip-flop is coupled to the other input of gate 344, while the enabling input of this flip-flop is coupled to output 339 of selecting and decoding means 334. Output Q of flip-flop 273'" is coupled to one of the inputs of an "AND" gate 345 the other input of which is coupled to the output of low frequency oscillator 294'" (with frequency of for example 1 Hz). The output of gate 345 is in one side connected to transductor 283'" and on the other side feeds oscyllator 286'". The apparatus also comprises another "AND" gate 346 that has one of its outputs coupled to the validation output 339 of selecting and decoding means 334. The other three inputs of gate 346 are connected to respective outputs 337a to 337c of decoders 336a to 336c according to the code elected for ordering the performance of desired electrically controlable operation. The output of gate 346 is coupled to the base electrode of a transistor 347 the emiting electrode of which is connected to ground 255''' and to the bussing electrode of which there is connected one of the ends of a relay energizing coil 348 being connected to the other end of the coil to terminal 281''' corresponding to the positive to the apparatus power supply. A protective diode 349 is connected in parallel with coil 348. On the other hand, the bussing electrode of transistor 347 is connected, through diode 350 and capacitor 290''' to the corresponding trigger input of monostable 291'''. At the sametime the bussing electrode of transistor 347 is also coupled to selecting electrode of transistor 279''' through a diode 351. The rest of FIG. 21 arrangement is similar to that described for FIG. 14.

FIG. 21 works as follows:

The calling party "dials" the phone number of the subscriber he wants to call. Once established the ring bell loop, he "dials" the preamble code, sending each character during an inactive ring bell signal period. The code characters appearing on input terminals 1''' and 2''' being connected to the phone line are applied other portions of the circuit, to the input of tone decoding means 266''' and are decoded into binary information. At the same time, output 342 of said decoders is applied to chronizer 297''' and the output of this is applied to inverter 341 the output of which goes into an "O" gate 340. The output of this later is applied to the corresponding inputs of "AND" gates 333a to 333d. If there is an H on the output 342 of tone decoding means 266''', the chronizer 297''' will delay and invert it and the H appearing at the input of "O" gate 340 unblocks gates 333a to 333d thus allowing the transference of information to selector and decoder 334. It must be noted that these later may be a suitable adaptation of those illustrated in FIG. 13. If the characters have entered within the time established by the chronizer 352, on being received the three of them, they will be transfered to DCB to decimal decoders 336a to 336c. If the code appearing at the output of these can go into the three inputs of gate 338, at the output of this later, an L state appear, triggering monostable 302''' during approximately 30 seconds. The output of this monostable is applied to transistor 279''' that, through diode 351, produces the sending of a confirmation signal to the phone line to be received by the calling party. On the other hand, due to the energizing of coil 280''' resistor 251 is connected in parallel to the line by the closing of relay 250''' (that is to say, the apparatus answers "electrically" the call) and at the same time the gain of amplifier 258''' is reduced by the closing of relay contact 264'''. At the same time, selecting and decoding means 334 are reset on being applied the output of monostable 302''' to reset input 339 of selecting and decoding means 334. The output of monostable 302''' also enables permanently gates 333a to 333b through "O" gate 340. Finally, it unblocks at the same time gates 343 and 346 and also enables flip-flop 273'''.

If the calling party, after having perceived the tone confirmating the preamble code, "dials" a second code, this will give place to the appearance of an H on the outputs of tone decoding means 266'''. If any of gates 343 or 346 receives the three H states on its corresponding inputs, an H will appear on its output. If the gate accomplishing this condition is 343, the flip-flop 273''' will change its state blocking, through its output Q, gate 344 and activating gate 345 that, through oscyllator 294''' will generate a tone activating electroaccoustic trasductor 283''' and at the same time will produce activation activation of monostable 291 that in its turn will trigger oscyllator 286''' that will send an artificial ring bell signal to the phone line that will be perceived by the calling party as a confirmation that his second code has been validated.

This condition will persist until the time of monostable 302''' is finished, or until the moment when the called subscriber unhooks the receiver of his phone set (in case he wants to answer the call).

In case, according to the second sent code, gate 346 is the enabled one, an H will appear on the output of this later activating transistor 347 that in its turn will produce the energizing of relay coil 348, being associated with this relay a normally open contact (not illustrated) that control the circuit desired to be electrically driven. At the same time, transistor 347, through diode 350, will produce the activation of monostable 291''' that in its turn will put in operation oscyllator 286''' that produces the sending of a confirmation tone to the phone line so that the calling party knows that the operation desired to be electrically controlled has been performed. The rest of the apparatus and its performance is according to what has been explained in reference to the other ways of realization such as the one of FIG. 14.

In FIG. 22 another embodiment of the present invention has been illustrated. Terminals 1 and 2 will be connected to the phone line. Terminal 2 is connected to ground 353 while terminal 1 is coupled to one end of a capacitor 354, the other end of which is coupled to the input of bandpass filtering means 355 which are capable of blocking the ringing signal and allow the passage of the tone signal. To this end the central frequency of the filtering means 355 is considerably higher than the frequency of the tone signal elected as a code. The output of the filtering means 355 is coupled to the input of amplifying means 356 the output of which is coupled to the input of rectifying means 357 which converts the a.c. of the tone signal, used for the code, to a d.c. signal. The output of the rectifying means is coupled to a first input of a Schmitt trigger 358. Terminal 1 is also coupled to one end of a resistor 359 the other end of which is coupled to one of the electrodes 360 of the neon light section of an optical coupler device 361 while its other electrode 362 is coupled to ground. The photoresistor section 363 of the optical coupler 361 has one of its ends coupled to the terminal 364 corresponding to the positive output of the power supply of the apparatus. The other end of the photoresistor section 363 is coupled to ground 353 through a resistor 365 and also to a first input of a Schmitt trigger 366. The second input of the Schmitt trigger 366 is coupled to a second input of the Schmitt trigger 358, while the output of the Schmitt trigger 366 is coupled to the input of a timer 367 its output being coupled to a third input of the Schmitt trigger 358. The output of this latter is coupled to the data input of a shift registering means 368 of eight stages, thus having eight outputs indicated in general at 369. The output of the Schmitt trigger 366 is coupled also to the clock input 370 of the shift registering means 368 while the output of the Schmitt trigger is coupled to the input of monostable means 371 and the output of this latter is coupled to the reset input 372 of the shift registering means 368. Each of the eight outputs 369 thereof are coupled to a corresponding one of the eight data inputs of an eight digits binary comparing means 373 having also eight control inputs indicated in general at 374. To the output 375 of the binary comparating means 373 is coupled the input of an inverter 376, its output being coupled simultaneously to the second input of the Schmitt trigger 366 and to the second input of the Schmitt trigger 358. To said output of the binary comparating means 373 is also coupled an indicating means 377 which, as an example only, has been illustrated as an electroacoustic transducer 377. Said output of the binary comparating means 373 is also coupled to the validating output terminal 378 of the apparatus. A switching means 379 is provided which has eight inverting switches 380a to 380h. The moving contact of each of these switches is connected to a corresponding one of said control outputs 374 of the binary comparing means 373, the first fixed contact of each switch 380a to 380h being connected to ground 353 and each second fixed contact being connected to terminal 364 corresponding to the positive of the power supply of the apparatus.

The operation of the embodiment of FIG. 22 is as follows.

The calling party "dials" the phone number of the called subscriber. When the exchange establishes the ring bell loop, a high a.c. voltage (90 V to 100 V) is applied to neon light 101, thus lighting it. At the same time, said voltage, through capacitor 102, is applied to input of the bandpass filtering means 355 and is blocked by said means, since the central frequency of said filtering means is considerably higher than the frequency of the ringing signal. At the same time, neon light 360-362 diminishes the resistance of photoresistor 363 and thus a positive potential is applied to the input of gate 366. Since to this gate is also applied a positive potential at its other input, on its output will appear an H state that is applied to the input of a timer 367. At the output of said timer, and after a short interval of time, there appears an L state that is applied to one of the inputs of gate 358, blocking it. In addition, the output of gate 358 applies an H potential to the clock input of a shift register 368, producing therein a shift of information. Nevertheless, since an H state is being applied to its reset input 37, all the registers are reset to L and therefore the shift before mentioned will produce no effect at all. If the calling party sends during the inter-ringing an audio tone the frequency of which coincides with that of filter 355, the before mentioned tone will pass through it, will be amplified by amplifying means 356, rectified by the rectifying means 357 and at the output thereof will appear an H state which will be applied to the input of gate 358. At the same time, during the periods that no ringing voltage is present, an L state will appear on the input of gate 366 that will generate another L state on the output of said gate. This state, when applied to the input of the timer 367, will produce an H state on the corresponding input of gate 358. As it also receives, through another of its inputs an H state, on the output of gate 358 will appear an H state that, when applied to the input of monostable 371 will trigger this latter during a period of about 1 minute.

At the output $\overline{Q}$ of said monostable 371 appears an L state that, when applied to the input of the shift register 9, enables it. When the ringing signal starts again, and since there is an H state on the input of the shift register 368, the shift of information will take place due to the change of state appearing on the clock input of the shift register. This can happen because the H state applied to the input of the timer 367 will generate an L state at its output only after a brief interval of time. The process before described takes place once per each train of the ringing signal introducing into the shift register L states or H states according to the information sent by the calling party. After eight informations, the register will have been filled and, if the code accumulated in it coincides with the one selected in code selector 379, comparator 373 will generate on its output an H state that will energize the piezoelectric transducer 377 generating a differentiated tone. The H state appearing on the output of the comparator 373 will be also applied to the input of inverter 376 which will be applied as an L state to the corresponding inputs of gates 366 and 358, respectively, thus preventing new changes in the contents of the shift register 368. When the time of the monostable 371 is over, there will appear an H state at its output which will be applied to the input 372 of the shift register 368. When L states appear at its output 375, on the output of the comparator 373 will appear an L state which will de-energize the acoustic piezoelectric transducer 377 and, when applied to the input of inverter 376 will apply an H state to the corresponding inputs of gates 366 and 358, respectively, unblocking it and thus the entire apparatus will be ready to receive a new information.

Due to the fact that, after the loop has been closed, the gain in the loop rises by a very substantial factor. Thus it may be very advatageous, under certain circumstances, to use amplifying means including automatic gain control (a.g.c.) features. The specific circuital details of such an amplifier does not form part per se of the invention, since such kind of amplifiers are obtainable in the market. However the use thereof in the apparatus of the invention is included within the scope of the invention. The use of such an amplifier provided with the a.g.c. feature is specially useful in embodiments such as those illustrated in FIGS. 1, 3 and 22; however, in certain telephone networks and exchanges its use may be even useful in embodiments such as those of FIGS. 14, 15, 20 and 21 in which a gain reducing resistor is automatically connected between input and output of the amplifier in response to the closing of the loop.

The skilled in this art will easily understand that while different embodiments of the invention have been here described and illustrated, several circuital changes and substitution of specific components may be introduced without altering the true spirit and scope of the invention. It will be understood also that any person skilled in this art will be able to easily combine certain features of some of the described and illustrated embodiments introducing them into other embodiments. For example, the automatic line release of certain embodiments may be incorporated into many other embodiments, the visual display feature, together with the associated circuits for controlling it, may be incorporated to other embodiments, some embodiments using decimal techniques may be adapted to other described embodiments using binary techniques, and so on. The alternatives contemplated within the true scope of the invention are so numerous that it materially would be here impossible to describe and illustrate them all and on the other hand, it is considered also unnecessary since, at the light of what has been described and illustrated here, any person skilled in the art may introduce easily, such changes and combination of features without necessarily contribute with new inventive concepts.

We claim:

1. A method for processing coded information received through a telephone line in a telephone system of the Touch-Tone type in which the system transmits ringing signals separated by inter-ring periods, the method comprising the steps of:
   (A) normally sending from a calling subscriber signals corresponding to the phone number of a called subscriber;
   (B) when the calling subscriber receives corresponding signals indicating that ringing signals are being sent to the called subscriber in response to the establishment of a ringing circuit between the calling and the called subscribers, sending from the calling subscriber at least one pre-established code signal during at least one of the inter-ringing periods;
   (C) suppressing at the called subscriber the ringing signals received during the ringing periods while letting through the code signal only when said code signal pertains to at least one pre-established code, and thus validating the code signal;
   (D) amplifying said code signals;
   (E) rectifying said amplified code signals;
   (F) deriving from said rectified code signals a triggering signal; and
   (G) in response to said triggering signal, and before the receiver of the phone set of the called subscriber has been unhooked, supplying an indication to the calling subscriber that the pre-established code signal has been received and validated.

2. A method for processing coded information received through a telephone line in a telephone system of the Touch-Tone type in which the system transmits ringing signals separated by inter-ring periods, the method comprising the steps of:
   (A) normally sending from a calling subscriber signals corresponding to the phone number of a called subscriber;
   (B) when the calling subscriber receives corresponding signals indicating that ringing signals are being sent to the called subscriber in response to the establishment of a ringing circuit between the calling and the called subscribers, sending from the calling subscriber at least one pre-established code tone signal during at least one of the inter-ringing periods;
   (C) suppressing at the called subscriber the ringing signals received during the ringing periods while letting through the code signal;
   (D) amplifying said code tone signals;
   (E) decoding said amplified code tone signals and comparing each said decoded code tone signal with pre-established memorized codes;
   (F) generating a validating signal in response to the comparison of a predetermined number of the decoded code tone signals;
   (G) deriving from said validating signal a triggering signal; and
   (H) in response to said triggering signal, and before the receiver of the phone set of the called subscriber has been unhooked, supplying an indication to the calling subscriber that the pre-established code signal has been received and validated.

3. A method according to claim 2, wherein the decoding of said step (E) comprises converting each said at least one pre-established code tone signal to a corresponding decimal signal, and wherein the comparing of said step (E) comprises comparing each corresponding signal with a plurality of memorized codes to determine if the identity of the decoded signal corresponds to one of the memorized codes, and wherein the generating of a validating signal of step (F) comprises determining if the decoded and compared signals of the code arrive in the correct sequence and with a correct time spacing between the successive signals of the code, and producing a validation signal only if all these conditions have been met.

4. A method according to claim 2, wherein step (H) comprises supplying an indication by means of a flashing light.

5. A method according to claim 2, wherein step (H) comprises supplying an indication by means of an electroacoustic transducer.

6. A method according to claim 2, wherein step (H) comprises supplying an indication by means of an alphanumerical display.

7. A method according to claim 2, wherein said generating of the validating signal in step (F) comprises enabling said generating by the presence of said ringing signals on the phone line, and to this end rectifying said ringing signals, smoothing out the amplitude variation of the rectified signals due to the non-ringing periods, stabilizing the amplitude of the smoothed rectified signals, and enabling said generating of the validating signal only in response to the presence of the stabilized signal.

8. A method according to claim 2, comprising the further step (I) of automatically releasing the called phone line after the reception of a predetermined number of ringing signals after establishment of the ringing circuit.

9. A method according to claim 2, comprising the further step (I) of automatically releasing the called phone line after a predetermined period of time has elapsed after establishment of the ringing circuit.

10. A method according to claim 2, wherein, in said comparison of the received code with the memorized codes of step (E), said memorized codes are manually programmable.

11. A method according to claim 2, wherein, in said comparison of the received code with the memorized codes of step (E), said memorized codes are electronically programmable.

12. A method according to claim 2, comprising the additional step (I) of automatically reducing the gain of said amplifying means.

13. A method according to claim 2, comprising the additional step (I) of automatically sending a ring-back confirmation signal to the calling apparatus in response to the generation of the validating signal.

14. A method for processing coded information received through a phone line in a telephone system of the "Touch-Tone" type in which the system transmits ringing signals separated by inter-ring periods and closes a loop when a telephone call is answered, the method comprising the steps of:
   (A) normally sending from a calling subscriber signals corresponding to the phone number of a called subscriber;
   (B) when the calling subscriber receives corresponding signals indicating that ringing signals are being sent to the called subscriber in response to the establishment of a ringing circuit between the calling and the called subscribers, sending from the calling subscriber a first pre-established tone code signal during at least one of the inter-ringing periods;

(C) blocking at the called subscriber the ringing signals received during the ringing periods while letting through a first tone code signal;

(D) amplifying said first tone code signal;

(E) decoding said amplified first tone code signal to obtain a first decoded signal having characters, and comparing each of said characters with corresponding characters of a first plurality of pre-established memorized codes;

(F) generating a validating signal in response to the decoding and comparing said first tone code signal;

(G) deriving from said validating signal a first triggering signal;

(H) in response to said first triggering signal, sending automatically through the phone line a ringback signal to the calling apparatus as a confirmation that the first tone code signal has been received and validated;

(I) also in response to said first triggering signal, automatically closing electrically the loop to simulate that the receiver of the called subscriber set has attended the call;

(J) sending through the calling apparatus a second pre-established tone code signal;

(K) decoding said second tone code signal to obtain a second decoded signal having characters, and comparing each of said characters with corresponding characters of a second plurality of pre-established memorized codes;

(L) generating a validating signal in response to the decoding and comparing of said second tone code signal;

(M) deriving from said validating signal a second triggering signal;

(N) in response to said second triggering signal, sending automatically through the phone line a ringback signal to the calling apparatus as a confirmation that the second tone code has been received and validated; and (O) in response also to said second triggering signal, and before the receiver of the phone set of the called subscriber has been unhooked, supplying an indication to the calling subscriber that the second tone code signal has been received and validated.

15. A method according to claim 14, wherein said steps (E) and (K) comprise decoding said first and said second tone code signals, respectively, by converting the tones of each of said characters to corresponding binary digit characters before comparing them with corresponding binary digit characters of respective said first and second pluralities of pre-established memorized codes.

16. A method according to claim 14, comprising the additional step of automatically activating, in response to said second triggering signal, an electrically operated apparatus to perform a specific function.

17. An apparatus for processing coded information received through a phone line forming part of a telephone system of the "Touch-Tone" type, said apparatus comprising:

a pair of input terminals connected to the phone line for receiving said coded information, bandpass filtering means coupled to said pair of input terminals and having a narrow bandpass corresponding to the frequency of at least one tone code character for filtering said coded information, amplifying means coupled to said filtering means for amplifying said filtered coded information, tone decoding means coupled to said amplifying means for decoding said amplified filtered coded information to obtain a decoded output characterized by a code and a code sequence, code selecting means coupled to the output of said tone decoding means for selecting said code, sequence decoding means coupled to the output of said code selecting means for decoding said code sequence, an AND gate having one input coupled to the output of said sequence decoding means, a flip-flop having a clock input coupled to the output of said AND gate, a Q output, and an inverted Q output coupled to the other input of said AND gate, a transistor coupled to the Q output of said flip-flop, a first relay having an energizing coil coupled to the collector electrode of said transistor, said first relay having a normally open contact, a phone set being coupled to said pair of input terminals through a series-connected manually actuatable switch, a second relay having an energizing coil and a normally closed contact for coupling said phone set to said pair of input terminals, an indicating circuit coupled to said phone line input terminals through said normally open contact of said first relay, a ringing signal rectifying means capacitively coupled to one of said pair of input terminals through said normally closed contact of said second relay for providing a d.c. output, smoothing filter means connected to said rectifying means for filtering said d.c. output thereof to obtain a filter output, voltage stabilizing means coupled to said smoothing filter means for stabilizing said filter output to obtain a stabilized output, and triggering means coupled to said voltage stabilizing means and having an output coupled to an enabling input of said flip-flop, and responsive to said stabilized output for triggering said flip-flop to enable said flip-flop.

18. An apparatus according to claim 17, comprising automatic phone line releasing means for releasing the phone line after a predetermined number of ringing signals have been received without the phone call having been answered.

19. An apparatus according to claim 17, comprising automatic phone line releasing means for releasing the phone line after a predetermined time has elapsed without the phone call having been answered.

20. An apparatus according to claim 17, wherein said code selecting means comprises a plurality of multi-position selector switches, one for each character of the pre-established codes.

21. An apparatus according to claim 17, wherein said filtering means comprise a high-pass filter of elliptical function of the Cauer type of three zeros, having a cut-off frequency of about 650 Hz.

22. An apparatus according to claim 17, wherein said filtering means comprise a high-pass filter substantially of the Sallen and Key type, having a cut-off frequency of about 650 Hz.

23. An apparatus for processing a ringing signal and coded information received through a phone line forming part of a telephone system of the "Touch-Tone" type, said apparatus comprising:

a pair of input terminals to be connected to the phone line for receiving said coded information, bandpass filtering means coupled to said pair of input terminals and having a narrow bandpass corresponding to the frequency of at least one tone code character for filtering said coded information, amplifying means coupled to said filtering means for amplifying said filtered coded information to obtain an amplified filtered coded information having tone characters, tone decoding means coupled to said amplifying means for decoding the tone characters into a plurality of binary system output signals, code accumulating means having a plurality of inputs each coupled to said tone decoding means for accumulating a code sequence based on a sequence of said plurality of binary output signals, and issuing a code sequence output and a data output, and having a further input and a reset input, a timer having an enabling input coupled to said code sequence output of said code accumulating means and a timing output coupled to said further input of said code accumulating means for insuring that said code sequence is received within a predetermined time, comparing means having a data input coupled to said data output of said code accumulating means, a ringing signal input terminal, an inverter having an input coupled to said ringing signal input terminal and having an output, a NOR gate having one input coupled to the output of said inverter and having another input coupled to a first output of said comparing means and having an output coupled to said reset input of said code accumulating means, a random access memory having a pre-established code output coupled to a corresponding input of said comparing means, a counter device having an output coupled to a sequential scanning input of said random access memory, an oscillation generator having an output coupled to the clock input of said counter device, a keyboard for introducing new pre-established codes and having an output coupled to a write input of said random access memory and also coupled to an input of said counter device, said counter device having an output coupled to another input of said comparing means, a three-section write-read inverting switch having a first section for selectively providing an output of said code accumulating means or an output of said random access memory to a data display, a second section for selectively applying a fixed reference potential to read or write inputs of said random access memory, and a third section for selectively applying a fixed control potential input to a control input of said oscillation generator, a transistor coupled to a general output of said comparing means, a first relay having an energizing coil coupled to a collector electrode of said transistor, said first relay having also a normally open contact, a phone set coupled to said pair of input terminals through a series-connected manually actuable switch, a second relay having an energizing coil and a normally closed contact coupling said phone set to said pair of input terminals, an indication circuit coupled to said pair of input terminals through said normally open contact of said first relay, ringing signal rectifying means capacitively coupled to one of said pair of input terminals through said normally closed contact of said second relay for providing a d.c. output, smoothing filter means connected to said rectifying means for filtering said d.c. output, voltage stabilizing means coupled to said smoothing filter means for stabilizing said filtered d.c. output, and triggering means coupled to said voltage stabilizing means and having an output coupled to said ringing signal input terminal, and responsive to said stabilized filtered d.c. output for triggering said ringing signal input terminal when said ringing signal is received through the phone line.

24. An apparatus according to claim 23, comprising automatic phone line releasing means for releasing the phone line after a predetermined number of ringing signals have been received without the phone call having been answered.

25. An apparatus according to claim 23, comprising automatic phone line releasing means for releasing the phone line after a predetermined time has elapsed without the phone call having been answered.

26. An apparatus according to claim 23, wherein said code selecting means comprises a plurality of multiposition selector switches, one for each character of the pre-established codes.

27. An apparatus according to claim 23, wherein said filtering means comprise a high-pass filter of elliptical function of the Cauer type of three zeros, having a cut-off frequency of about 650 Hz.

28. An apparatus according to claim 23, wherein said filtering means comprise a high-pass filter substantially of the Sallen and Key type, having a cut-off frequency of about 650 Hz.

29. An apparatus for processing coded information received through a phone line forming part of a telephone system of the "Touch-Tone" type, said apparatus comprising:

a pair of input terminals to be connected to the phone line for receiving said coded information, band-pass filtering means coupled to said pair of input terminals and having a narrow pass-band corresponding to the frequency of at least one tone code character for filtering said coded information, amplifying means coupled to said filtering means for amplifying said filtered coded information to obtain an amplified filtered coded information having tone characters, tone decoding means coupled to said amplifying means for decoding the tone characters into a plurality of decimal system output signals characterized by a code and a code sequence, code selecting means coupled to said tone decoding means for selecting said code and having a plurality of outputs one for each tone character of pre-established codes, a plurality of AND gates, one for each tone character of pre-established codes, and having one of a first input coupled to a corresponding one of said plurality of outputs of said code selecting means, and having a second input, sequence decoding means for decoding the code sequence, and having a plurality of inputs, one for each tone character of pre-established codes, and each being coupled to an output of a corresponding one of said plurality of AND gates, a flip-flop having a clock input coupled to said sequence decoding means, a further AND gate having a first input coupled to the output of said flip-flop and second and third inputs, an oscillation generator of very low frequency having an output coupled to said second input of said further AND gate, a timer having a triggering input selectively connectable to one of said plurality of outputs of said tone decoding means and responsive thereto for issuing a timer output corresponding to a desired time for transfer of said selected code via said plurality of AND gates to said sequence decoding means, a monostable device coupled to the output of said timer, and having an output coupled in parallel to said second input of said plurality of AND gates, to the enabling input of said flip-flop, and to said third input of said further AND gate, a first transistor coupled to said output of the monostable device, a first relay having an energizing coil coupled to a collector electrode of said first transistor and having a normally open contact connected to the pair of input terminals through a resistor simulating electrically the resistance of a conventional phone set, and having also a second normally open contact connected in parallel with said amplifying means through a gain reducing resistor, a second monostable device having a triggering input capacitively coupled to said collector electrode of the transistor, a ring-back oscillation generator coupled to the output of said second monostable device, said ring-back oscillation generator having an output coupled to one of said pair of input terminals for providing a ring-back signal thereto, a phone set coupled to said pair of input terminals through a series-connected manually actuable switch, a second relay having an energizing coil and a normally closed contact connecting said phone set to said pair of input terminals, and an indicating device coupled to the output of said AND gate, said normally closed contact of said second relay being connected in series with the pair of input terminals.

30. An apparatus according to claim 29, wherein said code selecting means and sequence decoding means comprise code display circuitry and circuitry for introducing new pre-established codes.

31. An apparatus according to claim 29, comprising automatic phone line releasing means for releasing the phone line after a predetermined number of ringing signals have been received without the phone call having been answered.

32. An apparatus according to claim 29, comprising automatic phone line releasing means for releasing the phone line after a predetermined time has elapsed without the phone call having been answered.

33. An apparatus according to claim 29, wherein said code selecting means comprises a plurality of multi-position selector switches, one for each character of the pre-established codes.

34. An apparatus according to claim 29, wherein said filtering means comprise a high-pass filter of elliptical function of the Cauer type of three zeros, having a cut-off frequency of about 650 Hz.

35. An apparatus according to claim 29, wherein said filtering means comprise a high-pass filter substantially of the Sallen and Key type, having a cut-off frequency of about 650 Hz.

36. A method for validating a telephone call between a calling party and a called party using a predesignated code in a telephone system of the Touch-Tone type, comprising the steps of:
 (A) transmitting, from the calling party, signals corresponding to the phone number of the called party;
 (B) establishing a ringing circuit to the called party in response to the signals corresponding to the phone number of the called party;
 (C) transmitting consecutive ringing signals, separated by corresponding inter-ring periods, over the ringing circuit to the called party;
 (D) transmitting, from the calling party during said corresponding inter-ring periods, at least one code signal; and
 (E) comparing said at least one code signal with said predetermined code, and in response to a match therebetween, validating said telephone call in response to transmission of said at least one code signal.

37. The method of claim 36, wherein step (D) further comprises suppressing said consecutive ringing signals received at the called party while letting through said at least one code signal.

38. The method of claim 36, comprising the further step of (F) notifying the called party when said telephone call is validated.

39. The method of claim 36, comprising the further steps of (F) closing a conversation loop once the telephone call is validated, (G) transmitting a further at least one code signal from the calling party to the called party, and (H) comparing said further at least one code signal to a further predesignated code to further validate the telephone call.

40. The method of claim 36, comprising the further step of (F) automatically stopping transmission of said consecutive ringing signals after transmission of a predetermined number of said consecutive ringing signals without validation of the telephone call.

41. A system for validating a telephone call between a calling party and a called party using a predesignated code for use in a telephone system of the Touch-Tone type, comprising:
 first transmitting means for transmitting, from the calling party, signals corresponding to the phone number of the called party;
 ringing circuit means responsive to the signals corresponding to the phone number of the called party for establishing a ringing circuit to the called party;
 second transmitting means for transmitting consecutive ringing signals, separated by corresponding inter-ring periods, over the ringing circuit to the called party;
 said first transmitting means adapted to transmit, from the calling party during said corresponding inter-ring periods, at least one code signal; and comparing means for comparing said at least one code signal to said predesignated code to validate said telephone call in response to transmission of a code signal corresponding to said predesignated code.

42. The system of claim 41, further comprising suppressing means for suppressing said consecutive ringing signals at the called party while letting through said at least one code signal.

43. The system of claim 41, further comprising indicator means for indicating to the called party when said telephone call is validated.

44. The system of claim 41, further comprising loop means responsive to validation of said telephone call for closing a conversation loop, said third transmitting means transmitting a further at least one code signal from the calling party to the called party, and said comparing means comparing said further at least one code signal to a further predesignated code to further validate the telephone call.

45. The system of claim 41, further comprising automatic stopping means responsive to transmission of a predetermined number of said consecutive ringing signals without validation of the telephone call for automatically stopping transmission of said consecutive ringing signals.

* * * * *